United States Patent
US 10,836,965 B2
Shekhar et al.
(45) Date of Patent: Nov. 17, 2020

(54) REACTOR APPARATUS FOR NON-OXIDATIVE HYDROCARBON CONVERSION TO AROMATICS, METHODS OF USING SAME, AND PRODUCTS MADE USING SAME

(71) Applicant: ExxonMobil Chemical Patents Inc., Baytown, TX (US)

(72) Inventors: Mayank Shekhar, Houston, TX (US); James R. Lattner, La Porte, TX (US); Federico Barrai, Houston, TX (US); Brian M. Weiss, Bridgewater, NJ (US); Dhaval A. Bhandari, Bridgewater, NJ (US); Joshua W. Allen, Branchburg, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/382,755

(22) Filed: Apr. 12, 2019

(65) Prior Publication Data
US 2019/0322949 A1 Oct. 24, 2019

Related U.S. Application Data

(60) Provisional application No. 62/661,940, filed on Apr. 24, 2018.

(51) Int. Cl.
*C10G 35/06* (2006.01)
*C10G 35/24* (2006.01)
(Continued)

(52) U.S. Cl.
CPC ............ *C10G 35/065* (2013.01); *B01F 3/026* (2013.01); *B01J 8/0278* (2013.01); *C10G 35/24* (2013.01);
(Continued)

(58) Field of Classification Search
CPC ............... C10G 35/065; C10G 35/24; C10G 2300/1025; C10G 2300/4081; B01F 3/026;
(Continued)

(56) References Cited

U.S. PATENT DOCUMENTS

| 855,522 A | 6/1907 | Mattocks |
| 4,704,497 A | 11/1987 | Gottlieb et al. |

(Continued)

FOREIGN PATENT DOCUMENTS

| WO | 2016/099739 A | 6/2016 |
| WO | 2018/044557 A | 3/2018 |

*Primary Examiner* — Brian A McCaig

(57) ABSTRACT

Methods of transforming a hydrocarbon feedstream into an aromatization product in a multi-stage reverse flow reactor (RFR) apparatus are disclosed. The methods include at least two reaction stages in series, at least one being a pyrolysis stage and at least another being a catalytic aromatization stage. Using a highly saturated hydrocarbon feedstream the pyrolysis stage focuses on desaturation, while the catalytic aromatization stage focuses on aromatization. The catalytic aromatization stage contains a aromatization catalyst that can include substantially no magnesium, scandium, yttrium, titanium, zirconium, hafnium, vanadium, niobium, tantalum, chromium, molybdenum, tungsten, manganese, rhenium, iron, ruthenium, cobalt, rhodium, nickel, palladium, platinum, copper, silver, gold, gallium, indium, tin, lanthanides, or actinides, or, in some cases, substantially no added active metals at all. The aromatization product can contain at least 35 mol % aromatic hydrocarbons, based on a total amount of hydrogen and hydrocarbons in the aromatized hydrocarbon product.

25 Claims, 1 Drawing Sheet

(51) Int. Cl.
*B01J 8/02* (2006.01)
*B01F 3/02* (2006.01)
(52) U.S. Cl.
CPC .............. *C10G 2300/1025* (2013.01); *C10G 2300/4081* (2013.01); *C10G 2400/30* (2013.01)
(58) Field of Classification Search
CPC ........ B01J 6/008; B01J 8/0278; B01J 8/0453; B01J 8/067
See application file for complete search history.

(56) References Cited

U.S. PATENT DOCUMENTS

| | | |
|---|---|---|
| 8,692,043 B2 | 4/2014 | Lauritzen et al. |
| 8,754,276 B2 | 6/2014 | Buchanan et al. |
| 9,144,790 B2 | 9/2015 | Lauritzen et al. |
| 2008/0142409 A1 | 6/2008 | Sankaranarayanan et al. |
| 2009/0209794 A1 | 8/2009 | Lauritzen et al. |
| 2016/0251279 A1 | 9/2016 | Tanev et al. |
| 2017/0088491 A1 | 3/2017 | Keusenkothen et al. |

REACTOR APPARATUS FOR NON-OXIDATIVE HYDROCARBON CONVERSION TO AROMATICS, METHODS OF USING SAME, AND PRODUCTS MADE USING SAME

CROSS-REFERENCE TO RELATED APPLICATIONS

This invention claims priority to and the benefit of U.S. Ser. No. 62/661,940, filed Apr. 24, 2018 which is incorporated herein by reference in its entirety.

FIELD

The invention relates to hydrocarbon dehydrocyclization to produce products such as aromatic hydrocarbon, to equipment and materials useful for dehydrocyclization, to hydrocarbon dehydrocyclization processes, and to using dehydrocyclization for hydrocarbon upgrading.

BACKGROUND

This section provides background information related to the present disclosure which is not necessarily prior art.

Aromatic hydrocarbon compounds such as benzene are frequently used for producing transportation fuels and petrochemicals such as styrene, phenol, nylon, polyurethanes, and many others. Benzene can be produced, e.g., by steam cracking and naphtha reforming. During steam cracking, a $C_{2+}$ hydrocarbon feed reacts in the presence of steam under high-temperature pyrolysis conditions to produce a product comprising molecular hydrogen, $C_{4-}$ olefin, other $C_{4-}$ hydrocarbon, and $C_{5+}$ hydrocarbon including aromatic hydrocarbon. The yield of aromatic hydrocarbon from steam cracking is generally much less than the yield of light hydrocarbon, and processes of significant complexity are typically needed for aromatics separation and recovery. Naphtha reforming catalytically produces a product having a much greater content of aromatic hydrocarbon than does steam cracker effluent, but the naphtha feed is itself useful for other purposes such as motor gasoline blendstock.

Attempts have been made to overcome these difficulties, and provide an efficient process for producing aromatic hydrocarbon at high yield from a relatively inexpensive feed. For example, processes have been developed for producing light aromatic hydrocarbon (e.g., benzene, toluene, xylenes (collectively "BTX"), and BTX together with naphthalene (collectively "BTXN"), from paraffinic $C_1$-$C_4$ feeds. The processes typically utilize a catalyst having a molecular sieve component e.g., ZSM-5, and a dehydrogenation component, such as one or more of Pt, Ga, Zn, and Mo. These catalysts typically simultaneously facilitate paraffinic dehydrogenation and dehydrocyclization (aromatization) in the same step/zone/reactor. These conventional processes typically operate at high temperature and low pressure. Although these conditions can increase the yield of aromatic hydrocarbons, they typically also lead to an increased rate of catalyst deactivation, mainly resulting from increased catalyst coking.

Catalytic reactions can be carried out in reverse-flow reactors, which can be operated in a way that lessens catalyst coke accumulation in comparison with conventional fixed-bed catalytic reactors. For example, a reverse-flow reactor can carry out a catalytic reaction such as hydrocarbon aromatization during forward flow, which deposits coke proximate to the catalyst. However, coke accumulation is managed by carrying out a reverse-flow oxidation reaction after the forward-flow reaction. The reverse-flow reaction combusts at least a portion of the catalyst coke, which decreases or substantially prevents the accumulation of catalyst coke in the reverse-flow reactor over repeated cycles of forward-flow/reverse-flow reactions. See, e.g., U.S. Pat. No. 4,704,497.

A more recent process, described in U.S. Pat. No. 8,754,276, includes carrying out a catalytic dehydrogenation reaction in a reaction zone of a reverse-flow reactor. The catalytic dehydrogenation is operated in forward flow to produce unsaturated products such as olefin and aromatic hydrocarbon (reaction mode). The reaction zone has a lesser temperature at the upstream end of the reaction zone. The temperature profile increases monotonically across the reaction zone to a greater temperature at the downstream end, with upstream and downstream being with respect to the flow of hydrocarbon feed. This temperature profile is said to benefit the catalytic dehydrogenation reaction by lessening undesired reversion reactions which produce products of greater saturation. Since the dehydrogenation reaction is endothermic, the reaction zone cools during dehydrogenation mode, which eventually lessens dehydrogenation efficiency. The reaction zone is reheated by operating the reactor in regeneration mode. During regeneration mode, a combustion mixture comprising oxidant and fuel is conveyed to the reactor. The fuel is combusted with the oxidant in a combustion zone located within the reactor. The combustion zone contains a selective combustion catalyst, and is located upstream of the reaction zone with respect to the flow of the combustion mixture. Heat transferred from the hot combustion products to the reaction zone reheats the reaction zone to a temperature sufficient for carrying out dehydrogenation mode operation. After the reactor is sufficiently reheated, regeneration mode is halted, and reaction mode operation is re-commenced. According to the patent, placing the selective combustion catalyst in the combustion zone ensures that combustion of the combustion mixture is carried out in the combustion zone, not in the reaction zone. Carrying out combustion within the reaction zone is said to be undesirable because it results in a deviation from the desired monotonic temperature profile, which during reaction mode would increase the undesirable reversion of product olefin and aromatic hydrocarbon to more saturated molecules. However, decreasing the amount of oxidant proximate to the dehydrogenation catalyst during the combustion mode also lessens the amount of catalyst coke that can be removed from the dehydrogenation catalyst.

Another way to control catalyst coking involves carrying out the aromatization processes with a decreased selectivity for catalyst coke. For example, U.S. Pat. No. 4,855,522 discloses using a dehydrocyclization catalyst comprising (a) an aluminosilicate having a silica-to-alumina molar ratio of at least 5 and (b) a compound of (i) Ga and (ii) at least one rare earth metal. The aromatization is carried out at a temperature$\geq$450° C. (e.g., 475° C. to 650° C.) and a pressure of from 1 bar to 20 bar. Other processes limit selectivity for catalyst coke by carrying out the reaction for a relatively short time (e.g., less than a day), and then halting the reaction so that the catalyst can be regenerated. For example, U.S. Patent Application Publication No. 2009/0209794 A1, and U.S. Pat. Nos. 8,692,043 and 9,144,790, disclose processes for aromatizing lower alkanes using a particulate catalyst, where the average catalyst particle residence time in the reaction zone between regeneration treatments is in the range of about 0.1 second to about 30 minutes. Maximum ethane conversion is about 63%, but the catalyst and process conditions that achieve appreciable ethane conversion also exhibit appreciable selectivity for methane.

There is therefore still a need for apparatus, systems, and processes for producing aromatics with greater selectivity for desired products, and lesser selectivity for catalyst coke and saturated hydrocarbon such as methane. Apparatus, systems, and processes are particularly desired having an improved product slate, e.g., one exhibiting a greater yield of BTX or BTXN in comparison with conventional processes.

SUMMARY

This section provides a general summary of the disclosure, and is not a comprehensive disclosure of its full scope or all of its features.

The invention is based in part on the discovery that greater selectivity to desired aromatics (e.g., BTXN) and lesser selectivity to saturated hydrocarbon and catalyst coke can be achieved by discretizing (separating) desaturation and aromatization steps in a tubular flow-through reactor into a pyrolysis stage and a catalytic aromatization stage. It has been found that carrying out the reaction in the specified reverse-flow reactor retains its desirable heat management features and decreases the exposure of the catalyst to steam at high temperatures in comparison with conventional aromatization processes. This in turn results in a very desirable feature: the specified reactor can employ catalysts of greater acidic functionality in comparison with conventional reactors. It also has been found that the catalysts used in the tubular flow-through reactor can have a lesser metals content in comparison with catalysts used in conventional aromatization processes. For example, the aromatization catalyst used in the tubular flow-through reactor can include substantially no magnesium, scandium, yttrium, titanium, zirconium, hafnium, vanadium, niobium, tantalum, chromium, molybdenum, tungsten, manganese, rhenium, iron, ruthenium, cobalt, rhodium, nickel, palladium, platinum, copper, silver, gold, gallium, indium, tin, lanthanides, or actinides, or, in some cases, substantially no added active metals at all.

Accordingly, certain aspects of the invention relate to a method of transforming a hydrocarbon feedstream into an aromatization product in a form of tubular flow-through reactor referred to as a reverse flow reactor ("RFR"). The method includes providing an RFR apparatus comprising at least two reaction stages in series, at least one being a pyrolysis stage and at least another being a catalytic aromatization stage. In the method, the catalytic aromatization stage includes at least one aromatization catalyst, such as at least one dehydrocyclization catalyst, to facilitate the formation of an aromatization product. The method utilizes various feeds, including at least one oxidant feedstream and at least one fuel feedstream. A hydrocarbon feedstream is also provided, e.g., one comprising at least 90 mol % $C_{2+}$ hydrocarbons and at least 80 mol % $C_2$-$C_7$ hydrocarbons, based on a total amount of hydrocarbons in the hydrocarbon feedstream.

The method can be carried out by operating the RFR cyclically, e.g., by operation the RFR in regeneration mode and then operating the RFR in reaction mode, or vice versa. Additional modes, e.g., one or more purge modes, can be carried out between the regeneration and reaction modes. During regeneration mode, (i) the oxidant feedstream is introduced into the RFR in a direction through the RFR's catalytic aromatization stage and into the pyrolysis stage, and (ii), the fuel feedstream is introduced into the RFR (a) in a direction through the catalytic aromatization stage and into the pyrolysis stage, or (b) into the pyrolysis stage but in a way that substantially bypasses the catalytic aromatization stage.

Regeneration mode includes reacting a first portion of oxidant in the oxidant feedstream with at least a portion of the fuel in the fuel feedstream. This reaction, which typically includes combustion, is carried out to heat the pyrolysis stage to a temperature of at least 700° C. Regeneration mode also includes reacting (typically combusting) a second portion of the oxygen in the oxygen-containing feedstream with combustible deposits in the RFR, e.g., combustible deposits in the pyrolysis stage and in the catalytic aromatization stage. During regeneration mode, the oxidant feedstream, the fuel feedstream, and effluent from the combustion reactions (collectively, a flue gas) flow with respect to the RFR in a first average flow direction toward a flue gas outlet port, and away from the RFR. The flue gas outlet port is in fluidic communication with the outward end of the pyrolysis stage.

Regeneration mode continues, typically until (i) the pyrolysis zone is sufficiently heated to produce a heated pyrolysis zone for the desired pyrolysis reaction during reaction mode and/or (ii) a sufficient amount of catalyst coke has been removed from the catalyst so that the desired aromatization reaction can be carried out during reaction mode. After regeneration mode operation is halted, reaction mode operation can be commenced, optionally after one or more intervening modes, such as one or more purge modes. During reaction mode, the hydrocarbons in the hydrocarbon feedstream are exposed to the heated pyrolysis zone temperature for a time and at a pressure sufficient to pyrolyse substantially-saturated hydrocarbons in the hydrocarbon feedstream. The pyrolysis produces a pyrolysis product, typically comprising at least 50 mol % unsaturated $C_{2+}$ hydrocarbons, based on a total amount of hydrogen and hydrocarbons in the thermal pyrolysis product. During reaction mode, the hydrocarbon feedstream and the pyrolysis product flow through the RFR in a second average flow direction that is substantially the reverse of the first average flow direction. Accordingly, during reaction mode the pyrolysis product flows toward the catalytic aromatization zone. The pyrolysis product contacts the aromatization catalyst in the catalytic aromatization stage for a time and at a temperature and pressure sufficient to form an aromatization product, typically comprising at least 35 mol % aromatic hydrocarbons, based on a total amount of hydrogen and hydrocarbons in the aromatization product. The aromatization product flows in the second average flow direction from the outward end of the catalytic aromatization stage (the end of the catalytic aromatization stage that is opposite the pyrolysis stage), and then out of the RFR via an aromatization product outlet port. Reaction mode is typically carried out until (i) the pyrolysis stage temperature has decreased to a temperature that is less than that needed for the desired hydrocarbon pyrolysis reaction and/or (ii) an accumulation of deposits in the RFR, particularly coke deposits proximate to the dehydrocyclization catalyst ("catalyst coke"), has attenuated the desired aromatization of the pyrolysis product.

The method can be operated cyclically, by repeating reaction mode operation and regeneration mode operation, one after the other, optionally with intervening mode such as one or more intervening purge modes between reaction mode and regeneration mode, Other aspects of the invention include apparatus and systems for carrying out the method, and the aromatized product produced by the method. Further areas of applicability will become apparent from the description provided herein. The description and specific examples in this summary are intended for purposes of illustration only and are not intended to limit the scope of the present disclosure.

DETAILED DESCRIPTION

Definitions

Figure 1:
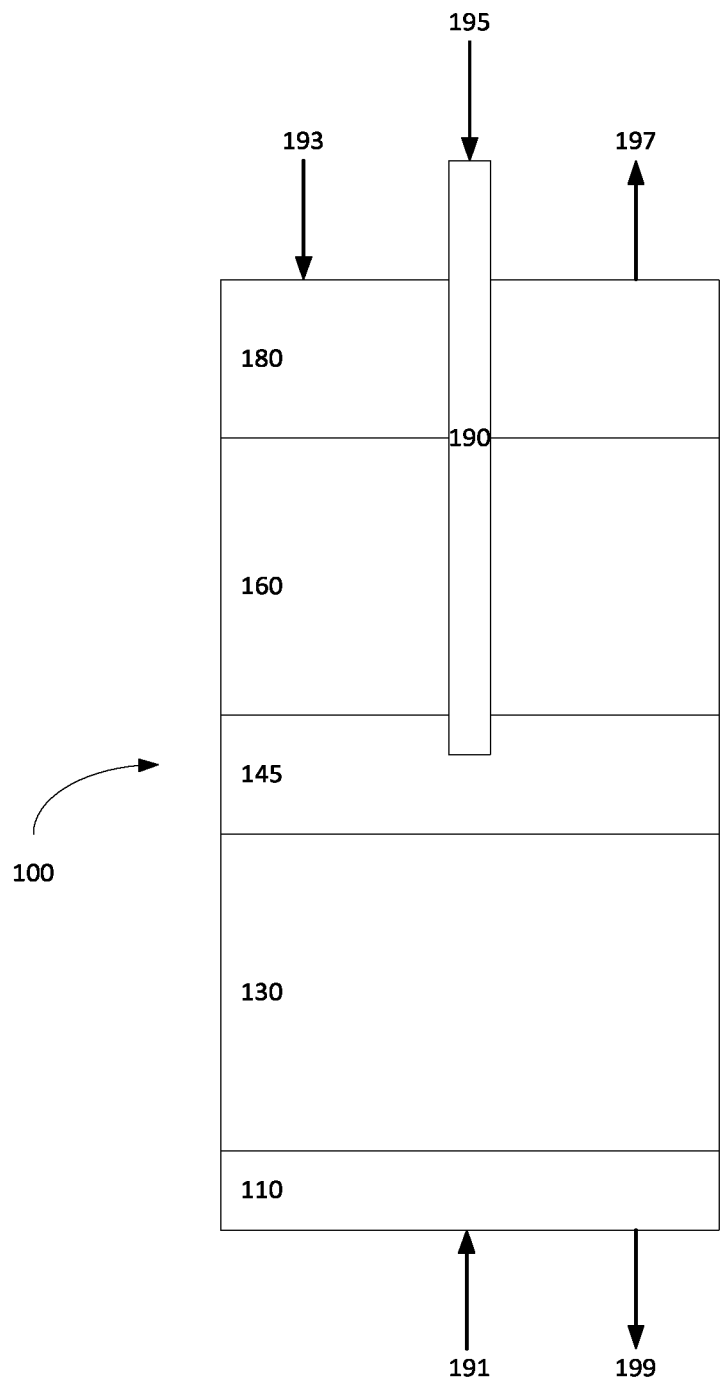
FIG. 1 shows a schematic drawing of a reverse-flow reactor (RFR) apparatus with a discretized two-step aromatization scheme according to the invention.

For the purpose of this description and appended claims, the following terms are defined.

All numerical values within the detailed description and the claims herein are modified by "about" or "approximately" the indicated value, and take into account experimental error and variations that would be expected by a person having ordinary skill in the art.

Unless specified otherwise, the term "substantially free of" with respect to a particular component means the concentration of that component in the relevant composition is no greater than 10 mol % (such as no greater than 5 mol %, no greater than 3 mol %, no greater than 1 mol %, or about 0%, within the bounds of the relevant measurement framework), based on the total quantity of the relevant composition. In the context of catalytically active metal components on or in aromatization catalysts, the phrase "substantially no" means 100 wppm or less, e.g., 70 wppm or less, or 50 wppm or less, or 30 wppm or less, or 20 wppm or less, or 10 wppm or less, or 5 wppm or less, or no detectable amount of the catalytically active metal component(s). Similarly, in the context of catalytically active metal components on or in aromatization catalysts, the phrase "substantially no added" means that, other than by virtue of trace impurities in other components that may have been intentionally added for another purpose, catalytically active metals are not deliberately added to the aromatization catalyst.

The term "$C_n$" hydrocarbon means hydrocarbon having n carbon atom(s) per molecule, wherein n is a positive integer. The term "$C_{n+}$" hydrocarbon means hydrocarbon having at least n carbon atom(s) per molecule. The term "$C_{n-}$" hydrocarbon means hydrocarbon having no more than n carbon atom(s) per molecule. The term "hydrocarbon" means a class of compounds containing hydrogen bound to carbon, and encompasses (i) saturated hydrocarbon, (ii) unsaturated hydrocarbon, and (iii) mixtures of hydrocarbons, and including mixtures of hydrocarbon compounds (saturated and/or unsaturated), such as mixtures of hydrocarbon compounds having different values of n.

The terms "alkane" and "paraffinic hydrocarbon" mean substantially-saturated compounds containing hydrogen and carbon only, e.g., those containing ≤1% (molar basis) of unsaturated carbon atoms. The term "unsaturate" and "unsaturated hydrocarbon" refer to one or more $C_{2+}$ hydrocarbon compounds which contain at least one carbon atom directly bound to another carbon atom by a double or triple bond. The term "olefin" refers to one or more unsaturated hydrocarbon compound containing at least one carbon atom directly bound to another carbon atom by a double bond. In other words, an olefin is a compound which contains at least one pair of carbon atoms, where the first and second carbon atoms of the pair are directly linked by a double bond. The term "aromatics" and "aromatic hydrocarbon" mean hydrocarbon compounds containing at least one aromatic ring.

The terms "reactor", "reactor system", "regenerator", "recuperator", "regenerative bed", "monolith", "honeycomb", "reactant", "fuel", and "oxidant" have the meanings disclosed in U.S. Pat. No. 7,943,808, which is incorporated by reference herein in its entirety. A "pyrolysis reactor" is a reactor, or combination of reactors or a system for hydrocarbon pyrolysis. The term "pyrolysis stage" means a reaction stage in which at least a pyrolysis reaction is carried out during reaction mode. The term "catalytic aromatization stage" means a reaction stage in which at least an aromatization (e.g., dehydrocyclization) reaction is carried out during reaction mode. A "region" or "zone" is a location, e.g., a specific volume, within a reactor stage, a location between two reactor stages and/or the combination of different disjointed locations in one or more reactor stages, which may include one or more reactor components and/or associated equipment and lines. A reactor or reaction stage can encompass one or more reaction regions zone. More than one reaction can be carried out in a reactor, stage, or region. The pyrolysis stage and catalytic aromatization stage are typically components of a reactor system, and more typically of a reactor included in a reactor system, such as a tubular flow-through reactor. During reaction mode, pyrolysis of the hydrocarbon feed is carried out in a pyrolysis region (or "pyrolysis zone") located in the pyrolysis stage, and aromatization of the pyrolysis product is carried out in a catalytic aromatization region (or "aromatization zone") located in the catalytic aromatization stage. Optionally, such a reactor includes means for conducting one or more feeds thereto and/or one or more products away therefrom. The terms pyrolysis stage and aromatization stage refer to locations in the reactor's internal volume, and consequently are present in the reactor's internal volume at those location during all modes. Those skilled in the art will appreciate, however, that the reactions carried out in zones within those stages at any particular time will depend on the reactor's operating mode at that time. During reaction mode, pyrolysis occurs in at least one zone in the pyrolysis stage and catalytic aromatization occurs in at least one zone of the catalytic aromatization stage. During regeneration mode, appreciable pyrolysis does not occur in any zone of the pyrolysis stage, nor does appreciable catalytic aromatization occur in any zone of the catalytic aromatization stage.

The specified reactor systems, reactors, and/or apparatus, typically an RFR or combination of RFRs, are described herein with respect to an orientation in which the first end and second ends represent top and bottom, such as in FIG. 1, and such that flow thus extends in a vertical direction from top to bottom and/or from bottom to top. Such reactors can have any convenient form, e.g., cylindrical, prismatic, etc. RFRs can be defined with more particularity by a height (relative to a top-to-bottom vertical orientation) and a cross sectional shape, e.g., one or more of a circular cross-section, an elliptical cross section, a cross-sectional shape having a perimeter comprising elliptical and/or circular segments, a substantially irregular polygonal cross section, and a substantially regular polygonal cross-section. The reactor can be segmented, e.g., with each segment along the reactor height having a different cross-sectional shape and/or cross-sectional size (e.g., cross sectional area). Regular polygons can have three or more vertices and an equal number of sides (equilateral triangle, square, regular pentagon, etc.). For odd-sided regular polygons, symmetry planes extend through the central point (representing a central axis of the prism), each vertex, and its opposite side; for even-sided polygons, symmetry planes extend through the central point (representing a central axis of the prism) and each pair of opposing vertices collinear with the central point, as well as through the central point (representing a central axis of the prism) and a center point of each pair of opposing sides, which (side) center points are also collinear with the central point (representing the central axis of the prism); for cylinders, an essentially infinite number of symmetry planes exist for each diameter of the circular cross-section of the cylinder. Therefore, with the vertical direction representing an axial direction in each case, a horizontal direction is thus orthogonal to the vertical direction and can represent either a radial direction for cylindrical apparatuses or an orthogonal direction for prism-shaped apparatuses (having regular polygonal cross-sections).

A pyrolysis region can include components, e.g., one or more thermal masses, having conduits, channels, and passages. The term "conduit" refers to means for conducting a composition from one location to another. The term encompasses (i) elementary conducting means, such as a pipe or tube, and (ii) complex means such as tortuous pathways through conducting means, e.g., pipes, tubes, valves, and reactors, that are filled with random packing. The term "passage" means a geometrically contiguous volume element that can be utilized for conveying a fluid within a reactor, regenerator, recuperator, regenerative bed, monolith, honeycomb, etc. The term "channel" means a plurality of passages that can be utilized together for conveying a fluid within the reactor, regenerator, recuperator, regenerative bed, monolith, honeycomb, etc. For example, a honeycomb monolith can comprise a single channel, with the channel having a plurality of passages or sets of passages.

An RFR can be a regenerative thermal RFR, refereed to an "RTRFR". An RTRFR is "reverse flow" in the sense that an upstream region of the reactor with respect to the average flow of a first feed mixture corresponds (e.g., a fuel feedstream during regeneration mode) to the downstream region with respect to the average flow of a second feed mixture (e.g., a hydrocarbon feedstream during reaction mode). The RTRFR is "thermal" in the sense that ≥50% (typically ≥75%, e.g., ≥90%) of the heat consumed by the on-average endothermic pyrolysis of the hydrocarbon feedstream during reaction mode is obtained by a transfer of heat to the pyrolysis reaction from the RFR itself, e.g., by a transfer of that was stored by the reactor during a mode carried out before the reaction mode (such as during a regeneration mode. Optionally, when carrying out thermal pyrolysis. Additional heat for the pyrolysis reaction can be provided by a transfer of heat (directly or indirectly) from an exothermic reaction e.g., an exothermic catalytic aromatization reaction, carried out in the RTRFR in proximity to the pyrolysis reaction. The RTRFR is "regenerative" in the sense that at least a portion of any stored heat transferred from the RFR to the pyrolysis reaction during pyrolysis mode is restored to the RFR by a transfer of heat to the RFR during a mode following the reaction mode (e.g., a regeneration mode). For example, during a regeneration time interval the RTRFR is operated in regeneration mode. In this time interval, fuel (e.g., from a fuel feedstream) is combined with oxidant (e.g., from an oxidant feedstream) and the mixture is combusted. Heat is transferred from the combustion to the RTRFR, which stores at least a portion of the transferred heat in one or more RTRFR components located in or proximate to an internal volume of the reactor, e.g., in a thermal mass. During another time interval, the RTRFR is operated in reaction mode. During reaction mode, a hydrocarbon feedstream is conducted to the RTRFR during a reaction time interval for pyrolysis of at least a portion of the hydrocarbon feedstream and catalytic aromatization of at least a portion of the pyrolysis product. Heat for the endothermic pyrolysis reaction is obtained from the RTRFR, e.g., by a transfer of heat from the thermal mass to the pyrolysis reaction. Typically the first (reaction) and second (regeneration) time intervals are non-overlapping. It is also typical that the first and second time intervals do not immediately precede or follow one another, e.g., allowing a time period for reactor operations such as valve switching during which regeneration and/or pyrolysis do not occur and/or allowing for other modes such as one or more purge modes. Regeneration and reaction modes may have equal durations or may be adjusted to have different durations. A lesser time interval duration in reaction mode (the first time interval, or $\Delta t_1$) as compared to the duration of the regeneration mode time interval (the second time interval, or $\Delta t_2$) may be beneficial in certain cases in order to avoid a significant buildup of non-volatile compounds, especially during reaction mode. Typically, $\Delta t_1$ is in the range of from 0.05 second to 120 seconds, from 0.1 second to 60 seconds, or from 0.5 second to 30 seconds, or from 1 second to 10 second, or from 1 second to 5 seconds. Also, typically the ratio of $\Delta t_1$ to $\Delta t_2$ ($\Delta t_1:\Delta t_2$) is in the range of from 1:10 to 50:1, e.g., 1:1 to 25:1, such as 1.5:1 to 10:1.

Cyclic operation of the RTRFR modes may be performed continuously and/or semi-continuously. Typically a cycle includes (i) the time duration of regeneration mode time, plus (ii) the time duration of reaction mode, plus (iii) the time duration of any purge modes, plus (iv) any time duration for switching between modes, and (v) any time duration for additional operations of the RTRFR carried out before the sequence (i)-(iv) is repeated. Typically, cycle time is in the range of 0.05 second to 240 seconds, 0.1 second to 120 seconds, or 0.5 second to 60 seconds, or 1 second to 20 second, or 1 second to 10 seconds.

The term "pyrolysis" means an (on average) endothermic reaction for converting molecules into (i) atoms and/or (ii) molecules of lesser molecular weight, and optionally (iii) molecules of greater molecular weight, e.g., processes for converting ethane and/or propane to molecular hydrogen and unsaturates such as ethylene, propylene, acetylene, butenes, benzene, toluene, xylenes, and/or naphthalene. A hydrocarbon feedstream is subjected to "thermal pyrolysis" when <50.0% of the heat utilized by the pyrolysis is provided by exothermically reacting the hydrocarbon feed, e.g., with an oxidant, e.g., ≤25%, such as ≤10%.

"Dehydrocyclization" means removing hydrogen from and cyclizing a non-cyclic hydrocarbon to produce aromatic hydrocarbon and typically (i) cyclo-paraffin and/or (ii) cyclo-olefin. Although dehydrocyclization can be carried out in one step including both dehydrogenation and cyclization, it can alternatively be carried out in two steps, e.g., dehydrogenation followed by cyclization of the dehydrogenated intermediate, or in three or more steps, e.g., normal paraffin dehydrogenation, of the olefinic intermediate, and additional dehydrogenation (aromatization) of the cyclo-olefin intermediate. In preferred embodiments, dehydrocyclization can be carried out in two or more steps. The dehydrocyclization (including any dehydrogenation carried out in connection with dehydrocyclization) is "non-oxidative" meaning that the reaction is carried out with little if any oxidative coupling of feed hydrocarbon, intermediate hydrocarbon (if any), or dehydrocyclization product. Dehydrocyclization can be a specialized form of pyrolysis, particularly when non-oxidative.

The term "selectivity" refers to the production (weight basis) of a specified compound in a reaction. As an example, the phrase "a hydrocarbon pyrolysis reaction has 100% selectivity for methane" means that 100% of the hydrocarbon (weight basis) that is converted in the pyrolysis reaction is converted to methane. When used in connection with a specified reactant, the term "conversion" means the amount of the reactant (weight basis) consumed in the reaction. For example, when the specified reactant is ethane, 100% conversion means 100% of ethane is consumed in the reaction. With respect to hydrocarbon pyrolysis the term "conversion" encompasses any molecular decomposition by at least pyrolysis heat, including cracking, breaking apart, and reformation. "Yield" is selectivity times conversion. Average conversion ("X") in a reaction zone, e.g., a pyrolysis zone, is the conversion achieved under average reaction conditions, such as average reaction temperature. Yield (weight basis) is conversion times selectivity.

The term "dry," with respect to feedstreams (typically, fluid) herein, means that a fluid feedstream contains 5000 wppm or less gaseous or liquid water (moisture) content, e.g., 3000 wppm or less, 2000 wppm or less, 1000 wppm or less, 500 wppm or less, or 100 wppm or less.

The term "Periodic Table" means the Periodic Chart of the Elements, as it appears on the inside cover of The Merck Index, Twelfth Edition, Merck & Co., Inc., 1996.

Certain aspects will now be described in more detail in which the pyrolysis of the hydrocarbon feedstream and catalytic aromatization of the pyrolysis products are carried out in an RTRFR. The invention is not limited to these aspects, and this description is not meant to foreclose other aspects within the broader scope of the invention, such as aspects in which the pyrolysis and catalytic aromatization are carried out in an RFR that is not an RTRFR, or are carried out in a reactor that is not an RFR.

Regenerative Thermal Reverse-Flow Reactors

The RTRFR is typically one that is capable of temperature, pressure and contact time constraints for producing commercial quantities of olefins and/or aromatics from a pyrolysis reaction. The RTRFR typically includes at least two reaction stages: a pyrolysis stage for carrying out pyrolysis of a hydrocarbon feedstream during reaction mode and a stage for carrying out catalytic aromatization of the pyrolysis product during reaction mode.

The RTRFR typically comprises a plurality of components, e.g., internal heat-storage and flow-control components. Besides these, the RTRFR can further comprise external components, e.g., associated equipment and lines, such as valves and piping for controlling the flow of feed streams to the RTRFR and of product streams away from the RTRFR. Typically, the RTRFR includes one or more thermal mass elements (e.g., one thermal mass or at least two thermal masses in fluid communication with each other and in series, one with the other or may include two thermal masses in series within a single reactor). The thermal mass is a material (e.g., a solid) that can transfer (e.g., absorb, store, and release) thermal energy over a temperature range for carrying out the reverse flow cycle, which includes pyrolysis reactions and any optional combustion reaction. For example, the thermal mass can be a solid material that can absorb, release, and store heat to and/or from reactants and products over a temperature range in which pyrolysis can be carried out, including those that do so without any significant phase change. A channeled thermal mass is a reactor component (e.g., a flow-control component) comprising refractory material such as one or more of alumina, silica, zirconia, yttria, etc. The refractory has a mass density $\rho_s$, referred to herein as a "solid density", and a heat capacity $C_p$ (measured at 25° C.) that is typically ≥0.05 cal./g ° C. The channeled thermal mass has an open frontal area ("OFA") for passing fluid into the channel(s), where OFA has the same meaning as in U.S. Pat. No. 5,494,881, which is incorporated by reference herein in its entirety. Examples of temperature ranges at which the thermal mass absorbs, stores, and releases thermal energy include a range of from 50° C. to 1500° C., from 100° C. to 1500° C., from 200° C. to 1500° C., from 250° C. to 1200° C., or from 300° C. to 1100° C.

In some aspects, the RTRFR's pyrolysis stage has the form of the reactor described in U.S. Pat. No. 9,499,457, the contents of which are incorporated by reference herein. In other aspects, the pyrolysis stage has the form described in one or more of U.S. Patent Application Publication No. 2007/0191664, U.S. Pat. No. 7,491,250, and U.S. Patent Application Publication Nos. 2007/0144940 and 2008/0142409. The RTRFR's thermal mass elements (and regenerative beds containing them) can be in the form of a refractory channeled member, e.g., those described in U.S. Pat. Nos. 8,754,276; 9,126,882; 9,346,728; 9,187,382; 7,943,808; 7,846,401; 7,815,873; and 9,322,549; and in U.S. Patent Application Publications Nos. 2007-0144940, 2008-300438, 2014-303339, 2014-163287, 2014-163273, 2014-0303416, 2015-166430, 2015-197696, and 2016-176781, inter alia. These references are incorporated by reference herein in their entireties. The RTRFR can include additional components, such as mixing components and insulation components (e.g., reactor components used to manage the heat transfer from the process flow within the reactor to the external surface of the reactor, such as insulation bricks, tiles or packing). The reactor components can be formed from different materials, such as from one or more refractory.

The choice of refractory composition is not critical, provided it is capable of surviving under reaction mode and regeneration mode conditions for practical run lengths (e.g., months) without significant deterioration or decomposition. Those skilled in the art will appreciate that the compositions of the thermal mass elements should be selected from among those that substantially maintain integrity (structural and compositions) and functionality during long term exposure to pyrolysis feeds, products, and reaction conditions, e.g., temperatures ≥750° C., such as ≥1200° C., or for increased operating margin ≥1500° C. Conventional refractories can be used, including those comprising at least one oxide of one or more elements selected from Groups 2-14 of the Periodic Table, but the invention is not limited thereto. In particular aspects, the refractory material can include an oxide of at least one of Al, Si, Mg, Ca, Fe, Mn, Ni, Co, Cr, Ti, Hf, V, Nb, Ta, Mo, W, Sc, La, Yt, Zr, and Ce. Alternatively or in addition, the refractory material can include non-oxide ceramic.

The thermal mass typically comprises one or more materials which facilitate the process of heat addition and removal. Such materials can be in the form of channeled thermal mass, which has a network of passages that are used by the gases in each step to transit the region containing the thermal mass's solid material. Regeneration mode typically imparts a profile of temperatures in the solid material, that is, a temperature that varies along the path by which the gases transit one or more passages in the thermal mass in proximity to the thermal mass's solid material (e.g., in proximity to substantially-solid walls separating adjacent channels in the thermal mass). The shape of that profile depends on many factors, including if and where a heat release (combustion) reaction occurs during regeneration mode, the initial temperature distribution, the duration of the regeneration mode ($\Delta t_2$), the flow rate and inlet temperature of the gas stream, and the heat capacity and transfer properties of the gas and solid material. On average, the solid material is hottest at the end of the regeneration mode. During reaction mode, the specified pyrolysis reaction consumes heat and reduces the solid material's average temperature. During reaction mode, the pyrolysis reaction and also typically the catalytic aromatization reaction changes the temperature profile of the thermal mass's solid material in a way that depends on many factors, including where the heat transferred from the thermal mass to the pyrolysis reaction occurs, and less typically where the heat transferred to or from the catalytic aromatization reaction to the thermal mass or to the pyrolysis reaction occurs. Changes in the thermal mass temperature profile during reaction mode can also depend on the initial temperature profile of the thermal mass at the start of reaction mode, the duration of reaction mode ($\Delta t_1$), the flow rate, heat capacity, and temperature of feed and product streams conducted to or away from the RTRFR during reaction mode, and the heat capacity and transfer properties of the thermal mass. RTRFR reactors typically do not operate in the steady state. That is, at any given location, the temperature is subject to change doing the course of regeneration mode and reaction mode. However, RTRFRs may be in a periodic steady state, meaning that the same cycling of temperatures occurs over and over as the reactor sequentially repeats regeneration and reaction mode operation, optionally with one or more intervening steps for purge mode operation.

The invention is compatible with a variety of RTRFR forms. For example, RTRFR forms which include a housing, a plurality of flow-controls (e.g., conduits and valves), one or more insulation components (e.g., insulation bricks) and one or more process flow components (e.g., thermal mass, mixing components, etc.) are within the scope of the invention. The housing can be utilized to enclose one or more regions of the RTRFR's internal volume. One or more insulation components disposed adjacent to the housing. The plurality of flow-controls may include one or more conduits, one or more apertures, and one or more valves that are configured to manage the flow of one or more streams into and out of the interior region from a location external to the interior region or housing. Process flow components can be configured and/or arranged to manage the flow of fluids through the RFR's internal volume. For example, certain process flow components may include a channeled thermal mass having a plurality of portions (e.g., a plurality of segments) with each having different flow passages and a wetted area. In some aspects, one or more mixers, distributors, or mixer-distributors can be used for mixing and/or for enhancing distribution of feed components during regeneration mode and less typically during reaction mode. In other aspects, one, some, or all of the mixers, distributors, or mixer-distributors can be unnecessary, and therefore not present in the RTRFR. For instance, U.S. Pat. No. 9,322,549, the contents of which are incorporated by reference discloses certain benefits and detriments of mixers/flow distributors in certain reverse-flow reactor designs and reaction processes, particularly with respect to balancing feed distribution and pressure drop therethrough. In addition, the portion of U.S. Pat. No. 7,815,873 describing mixer/flow distributors is incorporated by reference for its relevant teachings.

In some aspects, the RFR has the form of a tubular flow-through reactor, the RTRFR typically has opposed first and second ends, with a first opening at the first end and a second opening at the second end. Flanges typically cover the first and second openings, with the flanges being fluidically attached to valves, lines, etc. for transferring reactants and products into and away from the RTRFR's internal volume. In certain aspects, such an RTRFR is includes at least two stages in series in the RTRFR's internal volume, at least one being a pyrolysis stage which during reaction mode contains at least one thermal pyrolysis zone and at least another being a catalytic aromatization stage which during reaction mode contains at least one a catalytic aromatization zone. The pyrolysis stage and the catalytic aromatization stage each have opposed first and second faces which are open to fluid flow through those stage. Typically, the thermal pyrolysis and catalytic aromatization stages are adjacent, with the second face of the pyrolysis stage opposite the first face of the catalytic aromatization stage. The RTRFR typically further comprises first and second heat transfer stages located in the RTRFR's internal volume. The first heat transfer stage has a first face located adjacent to the RTRFR's first opening and an opposed second face opposite a first face of the thermal pyrolysis stage. The second heat transfer stage has a second face located adjacent to the RTRFR's second opening and an opposed first face opposite the second face of the catalytic aromatization stage. The first and second faces of the first and second heat transfer stages are each open to fluid flow through the stages. A variety of feeds, such as at least one oxidant feedstream, at least one fuel feedstream, and at least one hydrocarbon feedstream, etc., can be introduced into the RTRFR's internal volume, e.g., the via openings in the first and second flanges. The RTRFR can thus include one or more oxidant feed ports, one or more hydrocarbon feed ports, one or more product outlet ports, one or more flue gas ports, and optionally but preferably one or more purge ports. Through some or all of these ports, valves can be utilized, e.g., to alternate introduction (or removal) of a first stream and/or a second stream into or away from the RTRFR's internal volume.

The RTRFR's pyrolysis stage includes at least one thermal mass or a segment thereof for storing heat produced during regeneration mode and releasing stored heat to the pyrolysis reaction during reaction mode. Heat transfer stages, when present, also include at least one thermal mass or a segment thereof. Typically, the catalytic aromatization stage and the mixing-distribution stage (when present) include at least one thermal mass or a segment thereof. In certain aspects the RTRFR includes one thermal mass, with a segment thereof being located in each of the stages. When it is desired to store oxygen in the pyrolysis stage during regeneration mode, the thermal mass or thermal mass segment located downstream of the catalytic aromatization stage (with respect to oxidant flow) can include least one solid oxygen carrier, or "SOC". For example, the SOC can be included in a thermal mass located in the pyrolysis stage, e.g., as coating on the thermal mass's internal surface, such as a coating which includes the specified aromatization catalyst and the SOC. During regeneration mode, the SOC uptakes (typically by chemical bonding, chemisorption, physisorption, etc., collectively "sorption") an unreacted portion of the oxidant present in the pyrolysis stage to produce a pre-oxidized SOC. During reaction mode, the SOC releases at least a portion of the sorbed oxidant for reaction with molecular hydrogen produced during the pyrolysis, resulting in a reduced SOC and an improved yield of $C_{2+}$ unsaturates in the pyrolysis product. Since the release of the SOC's sorbed oxidant and the reaction of the released oxidant with molecular hydrogen are typically net exothermic, this can increase the amount of heat available for the endothermic pyrolysis reaction. Conventional SOCs can be used, but the invention is not limited thereto. Suitable SOCs are described in U.S. Patent Application Publication No. 2015/0065769 (where they are identified as oxygen storage materials), which is incorporated by reference herein in its entirety. Alternatively or in addition, staged oxygen introduction into the pyrolysis stage (or mixing-distribution stage, when present) during reaction mode can accomplish the same purpose.

In certain aspects, a form of regeneration mode is carried out for an initial heating of the RTRFR. In this form of regeneration mode, aromatization catalyst regeneration is optional—the mode is carried out mainly to establish the desired temperature profiles in the RTRFR's internal volume for the specified reaction mode and any purge mode carried out after this form of regeneration mode but before the start of reaction mode. Following a reaction mode, a second form of regeneration mode is used, in which both RTRFR reheating and aromatization catalyst regeneration are carried out. It is this second form of regeneration mode that typically is repeated cyclically with the reaction mode during continuous or semi-continuous operation of the RTRFR.

As an example, during a typical regeneration mode step carried out during continuous or semi-continuous operation of the RTRFR, a fuel and an oxidant can be delivered to a location along the RTRFR's internal flow path (e.g., a mixing-distribution stage), typically by way of the RTRFR's second opening. The delivered fuel and oxidant then exothermically react (combust) and heat at least a portion of the RTRFR's channeled thermal mass. Combustion products can then be exhausted, e.g., by flushing them from the reactor with a flushing or purge fluid such as an inert gas during a purge mode following the regeneration mode. Optionally, heat is transferred away from the second heat transfer stage (e.g., from a channeled thermal mass or segment thereof located in the second heat transfer stage) to at least the oxidant, in order to cool the second heat transfer stage and heat the oxidant. Likewise, it is optional to transfer heat from the flue gas to the first heat transfer stage (e.g., from a channeled thermal mass or segment thereof located in the first heat transfer stage) to cool the flue gas and heat the first heat transfer stage.

Following regeneration mode and optional purge mode, the hydrocarbon feedstream can be introduced into the RTRFR for reaction mode operation, typically via the RTRFR's first opening. During reaction mode, the hydrocarbon feedstream is exposed to the heated channeled thermal mass or segment thereof that is located in the first heat transfer stage. The heated feed mixture flows downstream toward the pyrolysis stage, where a portion of the hydrocarbon in the hydrocarbon feedstream is converted by thermal pyrolysis in a thermal pyrolysis reaction zone located in the pyrolysis stage.

The RTRFR's catalytic aromatization stage is located downstream (with respect to feed and product flows during reaction mode) of the pyrolysis stage. During reaction mode, thermal pyrolysis reaction products and/or unreacted hydrocarbon in the feed mixture contact at least one aromatization catalyst (typically at least one dehydrocyclization catalyst) located in the catalyst aromatization zone of the catalytic aromatization stage to produce aromatic hydrocarbon, and typically BTX or BTXN. During reaction mode, aromatization stage has a temperature profile that includes elevated temperatures but not temperatures as great as typically subsist in the thermal pyrolysis stage. Effluent from the catalytic aromatization stage, typically comprising aromatization products, unsaturated/cracked products of the pyrolysis stage's effluent, and/or any remaining unreacted hydrocarbon, is conducted away from the catalytic aromatization stage, typically via the second face from the feed mixture are conducted away from the second face of the catalytic aromatization stage to the first face of the second heat transfer stage. The catalytic aromatization stage's effluent is quenched in the second heat transfer stage by a transfer of heat from the effluent to a channeled thermal mass or a segment thereof located in the second heat transfer stage. Quenching substantially halts the pyrolysis/aromatization reactions to produce quenched aromatized and unsaturated products in the effluent transferred out of the RTRFR's second opening, typically via the second flange.

Feeds enter the RTRFR from an end of the reactor and should be distributed as evenly as possible across an array of substantially one-dimensional plug-flow (monolith) channels, e.g., channels of thermal mass in the RTRFR, in order to increase/maximize yields and/or reactor safety. In many incarnations of reverse-flow reactors, feeds can enter the reactor (and products can be removed from the reactor) through a relatively small number of ports (e.g., only 2 poppet valves), in order to decrease/minimize reactor and piping layout costs. For example, the RTRFR can have a first flange covering the RTRFR's first opening, and a second flange covering the RTRFR's second opening. The first and second flanges can each include two poppet valves. During reaction mode, hydrocarbon feed is admitted to the RTRFR via a first poppet valve associated with the first flange and a BTX or BTXN product is removed from the RTRFR via a first poppet valve associated with the second flange. During heating mode, oxidant is conducted into the RTRFR via a second poppet valve associated with the second flange, and flue gas is removed from the RTRFR via a second poppet valve associated with the first flange. The use of poppet valves as feed and/or product ports in pyrolysis and/or reverse-flow reactors is relatively well-known—see, for example, U.S. Patent Application Publication No. 2011/0291051, which is incorporated by reference herein. Hence, it can be particularly desirable for the reactor volume between the ports (valves) and the thermal mass(es) (monolith(s)) to be precisely designed or managed to dramatically distribute or homogenize feed flow before it contacts the monolithic channeled thermal mass(es).

For example, FIG. 1 shows a schematic drawing of a representative RTRFR 100. First heat transfer zone 110, when present, typically contains a thermal mass or thermal mass segment, e.g., to preheat incoming hydrocarbon feed 191 during pyrolysis mode to an appropriate temperature before entering thermal pyrolysis stage 130. In certain aspects, hydrocarbon feed 191 is a predominantly saturated hydrocarbon stream, e.g., containing at least 70 mol % $C_{2+}$ hydrocarbons (such as at least 75 mol %, at least 80 mol %, at least 85 mol %, at least 90 mol %, at least 95 mol %, at least 98 mol %, at least 99 mol %, or about 100 mol %), based on a total amount of hydrocarbons in thermal pyrolysis hydrocarbon feed 191. Additionally or alternatively, in such aspects, hydrocarbon feed 191 can contain at least 60 mol % C2-C7 hydrocarbons (e.g., at least 65 mol %, at least 70 mol %, at least 75 mol %, at least 80 mol %, at least 85 mol %, at least 90 mol %, at least 95 mol %, at least 98 mol %, at least 99 mol %, or about 100 mol %), based on a total amount of hydrocarbons in hydrocarbon feed 191. Certain aspects of reaction mode will now be described in more detail with reference to FIG. 1. During reaction mode hydrocarbon feed 191 is preheated in first heat transfer stage 110 and then pyrolysed (cracked) in at least one thermal pyrolysis zone located in thermal pyrolysis stage 130 under thermal pyrolysis conditions to form a thermal pyrolysis product. The pyrolysis product typically contains a relatively large proportion of unsaturated and/or olefinic ($C_{2+}$) hydrocarbons. That pyrolysis product can be cascaded (e.g., substantially without purification and/or isolation of by-products, such as unreacted hydrocarbon feed components) through mixing-distribution stage 145. Mixing-distribution stage 145 is utilized form mixing fuel and oxidant during regeneration mode, but during reaction mode typical transfers heat from mixing components in the mixing-distribution stage to the (endothermic) thermal pyrolysis reaction in thermal pyrolysis stage 130, and optionally also as needed to catalytic aromatization stage 160. The cascaded pyrolysis product can then proceed into a catalytic reaction zone in catalytic aromatization stage 160, where it can be contacted with at least one aromatization catalyst to facilitate an aromatization reaction to produce an aromatization product. Optionally, within catalytic aromatization stage 160 and/or within second heat transfer stage 180 a relatively inert (catalyst diluent) monolith or set of particles can be present. Also optionally but preferably, second heat transfer stage 180 can include a channeled thermal mass or segment of a channeled thermal mass to slow and/or halt pyrolytic (de-saturating and aromatization) reaction processes. Quenched product containing BTX and typically BTXN is conducted away from the RTRFR's second opening via line 197, for recovery of the BTX (or BTXN) and other desirable products.

During regeneration mode, oxidant, such as from a source of dry oxygen-containing material, is introduced into RTRFR 100 via line 193. Fuel (typically hydrocarbon) is introduced into RTRFR 100 via line 195. The oxidant is conducted through second heat transfer stage 180, and the heated oxidant is conducted to catalytic aromatization stage 160. A first portion of the oxidant removes at least a portion of (i) any accumulated deposits (e.g., combustible deposits in the second heat transfer stage) and (ii) accumulated catalyst coke in the catalytic aromatization stage 160. The catalyst coke removal at least partially regenerates the aromatization catalyst located in the catalytic aromatization zone that is within the catalytic aromatization stage. To facilitate reheating of the thermal mass(es) during regeneration mode, a fuel feedstream 195 is introduced into the RTRFR through tube 190, bypassing catalytic aromatization stage 160 (and second heat transfer stage 180. The fuel and a second portion of the oxidant (namely that portion of the oxidant remaining and combusting catalysts coke and other combustible deposits) are mixed in mixing-distribution stage 145 and combust (typically also in stage 145) for heating or reheating thermal mass(es) in stages 130 and 110. Flue gas is conducted away from the RTRFR's first opening via line 199.

Although mixers/distributors, plenums, ports/valves, catalytic/thermal pyrolysis particles/monoliths, and reactor internals, inter alia, are not shown in FIG. 1, that should be understood only for simplicity in rendering—such components are well known to be present and/or optional in an RTRFR, and their inclusion in the methods, systems, and products of the present invention is expressly contemplated.

Representative aspects of reaction mode operation will now be described in more detail with reference to the representative RTRFR. The invention is not limited to these aspects, and this description is not meant to foreclose other aspects of reaction mode within the broader scope of the invention.

Representative Reaction Mode

The reaction mode is typically carried out in steps, a pyrolysis step and a catalytic aromatization step. Except for that period of time at the start of reaction mode where the pyrolysis reaction has not yet produced a pyrolysis product, the pyrolysis step and the catalytic aromatization step typically occur simultaneously during the entirety reaction mode operation. During the pyrolysis step, the heated hydrocarbon feed in the pyrolysis stage is converted into unsaturates (e.g., olefins). In the catalytic aromatization step, at least a portion of the olefin and other unsaturates in the pyrolysis product are aromatized in the presence of aromatization catalyst to produce BTX, and typically BTXN. Advantageously, the pyrolysis product from the pyrolysis stage can contain a relatively large proportion of unsaturated hydrocarbons, particularly unsaturated $C_{2+}$ hydrocarbons. Such unsaturated hydrocarbons are more easily further converted, via a subsequent catalytic aromatization step, into an aromatized hydrocarbon product.

The pyrolysis product contacts the aromatization catalyst for a time and at a temperature and pressure sufficient to form the aromatized hydrocarbon product. Advantageously, the aromatization product can contain at least 35 mol % aromatic hydrocarbons, based on a total amount of hydrogen and hydrocarbons in the aromatized hydrocarbon product. The aromatization product is typically conducted away from the RTRFR via product outlet port (e.g., line 197 of FIG. 1).

Typically, the time duration of reaction mode ($\Delta t_1$) is generally ≤500 seconds, e.g., ≤250 seconds, such as ≤200 seconds. More typically, $\Delta t_1$ is in the range of from 0.05 second to 120 seconds, from 0.1 second to 60 seconds, or from 0.5 second to 30 seconds, or from 1 second to 10 second, or from 1 second to 5 seconds. The reaction mode duration $\Delta t_1$ is much shorter than is the case in conventional processes for producing light olefinic hydrocarbon, such as in steam cracking processes which typically exhibit a reaction mode time duration of weeks (or even months) before initiating regeneration mode (called decoking mode in the case of steam cracking). As a result of the relatively long reaction mode duration in steam cracking processes, the feed hydrocarbon is combined with an appreciable amount of water upstream of the cracking (hydrocarbon pyrolysis) reaction. The water is needed to decrease the amount of coke deposits forming during the pyrolysis that would otherwise form during such a lengthy pyrolysis time duration. It is believed that the water decreases coke accumulation during steam cracking mainly by decreasing hydrocarbon partial pressure, which drives the steam cracking reaction toward producing the desired light olefin product. Since an appreciable amount of water in the form of steam is present in the steam cracker effluent, the effluent cannot be exposed to aromatization catalyst without risking an undue loss of activity, e.g., as a result of aromatization catalyst de-alumination by steaming Certain aspects of the invention overcome this difficulty by virtue of the relatively short reaction mode time duration ($\Delta t_1$), which prevents an undue accumulation of coke in the pyrolysis RTRFR without the need for combining the hydrocarbon feed with steam. The relatively small amount of coke deposits that may accumulate in the RTRFR by the end of reaction mode (small in comparison with the amount that will have accumulated in a steam cracker furnace tube at end of steam cracking mode) is readily removed during a relatively brief regeneration mode (brief in comparison with the duration of a steam cracker's decoking mode). Since coke accumulation in the RTRFR is substantially prevented without the need for combining the hydrocarbon feed with water, the pyrolysis effluent can be substantially-free of steam, and thus can be conducted to the aromatization stage without appreciable steaming of the aromatization catalyst.

Non-limiting examples of (i) pyrolysis conditions in the pyrolysis stage, (ii) hydrocarbon feedstream to the pyrolysis stage, (iii) pyrolysis products, (iv) catalytic aromatization process conditions in the catalytic aromatization stage, (v) aromatization (dehydrocyclization) catalysts, and (vi) aromatization product will now be described in more detail. This description should not be interpreted as foreclosing other aspects of features (i)-(vi) within the broader scope of the invention.

Pyrolysis Conditions

The thermal pyrolysis zone of the pyrolysis stage can be operated at a desired/peak pyrolysis temperature range effective for producing high quantities of olefins from hydrocarbon in the hydrocarbon feed, such as compared to typical pyrolysis reactions. In some aspects, the hydrocarbon feedstock can be exposed to a desired thermal pyrolysis temperature of less than 1200° C. in the thermal pyrolysis zone, e.g., from 600° C. to 1100° C., from 650° C. to 1000° C., from 650° C. to 1050° C., or from 700° C. to 1000° C.

In some aspects, the thermal pyrolysis zone can be operated at a pressure range effective for producing high quantities of olefins such as ethylene from hydrocarbon in the feed relative to typical pyrolysis reactions. In such aspects, the thermal pyrolysis zone is operated to expose a hydrocarbon feed stock to an effective olefin-producing (or specifically ethylene-producing) temperature within the thermal pyrolysis zone at a pressure range further effective for producing high quantities of olefins (ethylene). In such aspects, the thermal pyrolysis zone is operated to expose a hydrocarbon feed stock to an effective olefin-producing temperature within the thermal pyrolysis zone at a pressure range further effective for producing high quantities of $C_{2+}$ olefins. In some aspects, the thermal pyrolysis zone can be highly effective at a pressure condition in which the hydrocarbon has a partial pressure of ≥7 psia (50 kPaa), ≥10 psia (70 kPaa), ≥20 psia (140 kPaa), or ≥30 psia (210 kPaa).

Thermal pyrolysis reactions are effectively carried out to produce high quantities of olefins (and/or aromatics) over a wide range of pressures, including relatively high pressures. For example, thermal pyrolysis reactions can be highly effective at a pressure condition in which the thermal pyrolysis zone of the reactor is at a total pressure of ≥5 psig (30 kPag), ≥15 psig (100 kPag), ≥40 psig (280 kPag), ≥80 psig (550 kPag), or ≥120 psig (830 kPag). For practical considerations on total pressure, the pyrolysis reaction can be carried out at a pressure condition in which the thermal pyrolysis zone is at a total pressure of ≤500 psig (3.4 MPag), ≤300 psig (2.1 MPag), or ≤150 psig (1.0 MPag). In certain aspects, the pressure drop across the pyrolysis stage and/or across the catalytic reaction stage, whether in every RTRFR mode or only during the reaction mode(s), can be 30 psig (210 kPag) or less, e.g., 25 psig (170 kPag) or less, or 20 psig (140 kPag) or less, or 15 psig (100 kPag) or less, or 10 psig (70 kPag) or less, or 5 psig (30 kPag) or less, or 2 psig (10 kPag) or less.

Total gas residence time for the pyrolysis gas stream (i.e., total gas comprising the feed and product components) within the thermal mass(es) of the pyrolysis stage can be relatively short. For example, hydrocarbon feed can be passed through the pyrolysis stage at a total gas residence time in the thermal mass of ≤10 seconds, or ≤7.0 seconds, or ≤5.0 seconds, or ≤3.0 seconds, or ≤2.0 seconds, or ≤1.0 second, or ≤0.8 second, or ≤0.75 second, or ≤0.6 second, or in the range of 0.001 second to 10 seconds, or in the range of 0.01 second to 5.0 seconds, or in the range of 0.01 second to 1.0 second.

Total gas residence time for the pyrolysis gas stream passing through the thermal mass(es) of located in the pyrolysis stage can be particularly short at higher temperatures in order to produce greater quantities of the desired olefins and/or aromatics. In some aspects, the pyrolysis reactor is configured so that hydrocarbon feed can be passed through the thermal mass(es), encountering a temperature greater than 800° C. for a relatively short residence time, particularly relative to residence times typical for making coke (e.g., a total gas residence time above 800° C. in the thermal mass of ≤5.00 seconds, or ≤3.00 seconds, or ≤1.00 second, or ≤0.700 second, or ≤0.500 second, or ≤0.300 second, or ≤0.100 second, or ≤0.050 second, or in the range of 0.001 second to 5.00 seconds, or in the range of 0.002 second to 1.00 second, or in the range of 0.002 second to 0.300 second).

The pyrolysis stage typically converts ≥10 wt. %, or ≥20 wt. %, or ≥30 wt. %, or ≥40 wt. %, or ≥50 wt. % of total hydrocarbon in the hydrocarbon feedstock to the desired pyrolysis product.

Hydrocarbon Feedstock

The hydrocarbon feedstock (or "hydrocarbon feed") comprises hydrocarbons derived from any convenient source of hydrocarbon, natural or artificial. Hydrocarbons of the hydrocarbon feed may be optionally treated before use in the process. For example, such treatment can include treatment by resid hydrotreaters, hydrovisbreakers, acid washes, filtration, chelation, membrane or filtration, distillation, solvent extraction, adsorption, resid hydrotreater, acid extraction, any number of metals reduction processes, or any combination thereof. The hydrocarbon feedstock typically comprises one or more $C_2$ to $C_9$ non-aromatic hydrocarbon compounds, e.g., one or more light hydrocarbon (i.e., $C_2$ to $C_5$) compounds, such as one or more paraffinic light hydrocarbon compounds. For example, the feedstock can comprise ≥1 wt. % based on the weight of the feedstock of one or more of (i) paraffinic $C_2$ to $C_9$ hydrocarbon, (ii) aliphatic $C_2$ to $C_9$ hydrocarbon, (iii) aliphatic paraffinic $C_2$ to $C_9$ hydrocarbon, (iv) paraffinic light hydrocarbon, (v) aliphatic light hydrocarbon, and (vi) aliphatic paraffinic light hydrocarbon; such as ≥10 wt. %, or ≥25 wt. %, or ≥50 wt. %, or ≥75 wt. %, or ≥90 wt. %, or ≥95 wt. %.

In certain aspects, the hydrocarbon feedstock comprises ≤10 mole % of water in any form (per mole of hydrocarbon feedstock), e.g., ≤1.0 mole %, such as ≤0.1 mole %, or ≤0.01 mole %. In particular aspects, the hydrocarbon feed is a dry feedstock, e.g., a dry natural gas. It has been found that decreasing the amount of water present during the pyrolysis reaction beneficial decreases the amount of steam to which the aromatization catalyst is exposed during the aromatization of the olefinic hydrocarbon produced by the pyrolysis. Contacting conventional aromatization catalysts with steam typically results in a loss of acidity (e.g., by de-alumination as would occur when steaming ZSM-5). A loss in acidity of the aromatization catalyst typically results in a decrease in the catalyst's effectiveness, and, consequently, a decrease in the yield or the desired aromatic product. Accordingly, the use of a dry hydrocarbon feed beneficially increases aromatics yield.

Hydrocarbons useful as hydrocarbon feed or components thereof include chemical compounds having at least one C bound to at least one H. The hydrocarbon compounds may contain (i) minor components of covalently bound heteroatoms (such as <10 wt. %, based on total weight of the hydrocarbon feed) and (ii) minor (<10 wt. %, based on total weight of the hydrocarbon feed) components of non-covalently bound heteroatoms (e.g., $H_2O$). Reference to "hydrocarbon compounds" or "hydrocarbons in the hydrocarbon feed" means molecules that contain at least hydrogen and carbon and, optionally containing one or more heteroatoms such as oxygen, sulfur, and nitrogen. Weight percentages of hydrogen and carbon, as used to characterize the hydrocarbon content of the thermal pyrolysis feed, are typically provided as a percentage of the total hydrocarbon compounds in the pyrolysis feed. Preferably, the hydrocarbon compounds are comprised of at least 75 percent (%) of both carbon and hydrogen, based on total atom content of the hydrocarbon compounds in the total hydrocarbon feed to the reactor.

The hydrocarbon portion of the hydrocarbon feed may include, by way of non-limiting examples, $C_{2+}$ hydrocarbons (containing two or more carbon atoms). For example, the hydrocarbon of the hydrocarbon feed can comprise one or more of ethane, ethylene, propane, propylene, butane, butylene and higher hydrocarbons. Additional examples of $C_{2+}$ hydrocarbons can include, but are not limited to, Fischer-Tropsch liquids/products, shale gas, biogas, associated gas, natural gas and mixtures or components thereof, steam cracked gas oil and residues, gas oils, heating oil, jet fuel, diesel, kerosene, gasoline, naphtha (including coker naphtha, steam cracked naphtha, and catalytically cracked naphtha), hydrocrackate, reformate, raffinate reformate, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, synthetic crudes, shale oils, coal liquefaction products, coal tars, tars, atmospheric resid, heavy residuum, $C_4$'s/residue admixture, naphtha residue admixture, cracked feed, coker distillate streams, hydrocarbon streams derived from plant or animal matter, and any mixtures thereof.

Particular hydrocarbons useful in hydrocarbon feed according to this invention are those that can be pyrolysed to produce a product containing olefinic and/or aromatic compounds, particularly ethylene, benzene, toluene, xylenes, naphthalene, and combinations thereof, at the desired pyrolysis conditions of temperature, pressure, and total gas residence times. Typically, the hydrocarbon compounds are those that can be pyrolysed to produce product containing ≥1 vol. %, such as ≥3 vol. % or ≥6 vol. %, olefinic and/or aromatic compounds, based on total volume of pyrolysis product produced form the pyrolysis process.

In some aspects, the hydrocarbon feed or feed mixture can comprise hydrocarbons rich in ethane. For example, hydrocarbons rich in ethane can be hydrocarbons comprised of ≥50 mol %, or ≥55 mol %, or ≥60 mol %, or ≥65 mol %, or ≥70 mol %, or ≥75 mol %, or ≥80 mol %, or ≥85 mol %, or ≥90 mol %, or ≥95 mol %, or ≥98 mol %, or ≥99 mol % $C_{2+}$ hydrocarbons, $C_2$-$C_7$ hydrocarbons, or ethane. The hydrocarbons can be provided from any source. For example, the ethane can be provided from synthetic or natural sources. In one aspect, the ethane is provided from a petroleum refining process. In an alternative aspect, the ethane may be provided from a geological source or geological origin, such as natural gas.

In some aspects, the hydrocarbon feedstream can contain at least 90 mol % $C_{2+}$ hydrocarbons and/or at least 80 mol % $C_2$-$C_7$ hydrocarbons, based on a total amount of hydrocarbons in the hydrocarbon feedstream. Optionally but preferably, the hydrocarbon feedstream can contain less than 5 mol % $C_1$ hydrocarbons and/or at least 50 mol % $C_2$ hydrocarbons, based on a total amount of hydrocarbons in the hydrocarbon feedstream.

The hydrocarbon feed can optionally include one or more diluents. Typical diluents are compounds that are essentially non-reactive under pyrolysis conditions as specified herein, e.g., compounds that are essentially resistant to cracking at the pyrolysis conditions in the pyrolysis zone of the reactor. Diluent can be used to moderate the pyrolysis reaction(s), e.g., to control total pressure in the reactor. Suitable diluents include those comprising one or more of methane, water (e.g., steam), hydrogen, nitrogen, noble gases such as helium, neon, and argon, and combinations thereof. In some aspects, the diluent can comprise a non-hydrocarbon sweep gas that can help to cascade pyrolysis product to the catalytic aromatization stage and to direct aromatization product toward the product outlet port.

In certain aspects, the hydrocarbon feed can comprise diluent in which ≥10 wt. %, ≥20 wt. %, ≥30 wt. %, ≥40 wt. %, or ≥50 wt. % of total hydrocarbon feed is diluent. The amount of diluent can typically depend on desired total pressure of the thermal pyrolysis reaction carried out in the pyrolysis stage and desired partial pressure of the hydrocarbons. Diluent can be particularly useful to increase total pressure and to reduce coke formation. For example, diluent can be particularly useful at a total thermal pyrolysis pressure of ≤15 psig (100 kPag), ≤40 psig (280 kPag), ≤80 psig (550 kPag), or ≤120 psig (830 kPag).

In certain aspects, the source of light hydrocarbon includes natural gas, e.g., raw natural gas ("raw gas"). Natural gas is (i) a mixture comprising hydrocarbon, (ii) primarily in the vapor phase at a temperature of 15° C. and a pressure of 1.013 bar (absolute), and (iii) withdrawn from a geologic formation. Natural gas can be obtained, e.g., from one or more of petroleum deposits, coal deposits, and shale deposits. The natural gas can be obtained by conventional production methods but the invention is not limited thereto. Raw natural gas is a natural gas obtained from a geologic formation without intervening processing, except for (i) treatments to remove impurities such as water and/or any other liquids, mercaptans, hydrogen sulfide, carbon dioxide; and (ii) vapor-liquid separation, e.g., for adjusting the relative amounts of hydrocarbon compounds (particularly the relative amounts of $C_{4+}$ hydrocarbon compounds) in the natural gas; but not including (iii) fractionation with reflux. Conventional methods can be used for removing impurities and/or adjusting the relative amount of hydrocarbon compounds present in the feedstock, but the invention is not limited thereto. One suitable raw natural gas comprises 3 mole % to 70 mole % methane, 10 mole % to 50 mole % ethane, 10 mole % to 40 mole % propane, and 5 mole % to 40 mole % butanes and 1 mole % to 10 mole % of total $C_5$ to $C_9$ hydrocarbon. In certain aspects, ≥50 wt. % of the feedstock comprises natural gas, such as raw natural gas, e.g., ≥75 wt. %, or ≥90 wt. %, or ≥95 wt. %.

Any form of raw gas can be used as a source material, although the raw gas is typically one or more of (i) gas obtained from a natural gas well ("Gas Well" or Non-associated" gas), (ii) natural gas obtained from a condensate well ("Condensate Well Gas"), and (iii) casing head gas ("Wet" or "Associated" gas).

Suitable hydrocarbon feeds include those disclosed in U.S. Patent Application Publication No. US2017-0305812A1, which is incorporated by reference herein in its entirety. In certain aspects, e.g., those where a relatively greater aromatics yield is desired, a dry hydrocarbon feed is utilized and diluent (when used) is substantially free of water in any form. For example, in such aspects the diluent can comprise ≤5000 wppm of water in any form, such as ≤3000 wppm, or ≤2000 wppm, or ≤1000 wppm, or ≤500 wppm, or ≤100 wppm.

Pyrolysis Product

The pyrolysis product is the effluent mixture from the pyrolysis stage, and can comprise, e.g., $C_1$-$C_{10}$ substantially-saturated hydrocarbon, such as paraffinic $C_1$-$C_{10}$ hydrocarbon. The pyrolysis product can typically comprise unreacted hydrocarbon feed (e.g., ethane), predominantly olefinic compounds (e.g., ethylene, acetylene, propylene, 1-butene, 2-butene, 1,3-butadiene, and mixtures thereof), and/or even some aromatic compounds (e.g., benzene, toluene, o-xylene, m-xylene, p-xylene, ethylbenzene, styrene, α-methylstyrene, mesitylene, 1,2,3-trimethylbenzene, 1,2,4-trimethylbenzene, cumene, naphthalene, methylnaphthalene, and mixtures thereof), optionally other saturated hydrocarbons different from the unreacted feed (e.g., methane, propane, butanes, hexanes, and mixtures thereof, when the feed comprises or is ethane), other cracking by-products (e.g., $H_2$), optional diluent, non-volatiles, etc.

In some aspects, the pyrolysis product can include at least 40 mol % (e.g., at least 45 mol %, at least 50 mol %, at least 55 mol %, at least 60 mol %, at least 65 mol %, at least 70 mol %, at least 75 mol %, at least 80 mol %, at least 85 mol %, at least 90 mol %, or at least 95 mol %) unsaturated $C_{2+}$ hydrocarbons (e.g., $C_2$-$C_6$ unsaturated hydrocarbons), based on a total amount of hydrogen and hydrocarbons in the thermal pyrolysis product. In some aspects, the pyrolysis product can include at least 40 mol % (e.g., at least 45 mol %, at least 50 mol %, at least 55 mol %, at least 60 mol %, at least 65 mol %, at least 70 mol %, at least 75 mol %, at least 80 mol %, at least 85 mol %, at least 90 mol %, or at least 95 mol %) ethylene, based on a total amount of hydrogen and hydrocarbons in the pyrolysis product.

In certain aspects, e.g., those where a dry hydrocarbon feed is utilized and the diluent is substantially free of water in any form, the pyrolysis product typically comprises ≤5000 wppm of water in any form, such as ≤3000 wppm, or ≤2000 wppm, or ≤1000 wppm, or ≤500 wppm, or ≤100 wppm.

Representative Aromatization Catalysts

Any convenient form of aromatization catalyst can be used in the catalytic aromatization zone of the catalytic aromatization stage, but preferably one that can be readily located in an RTRFR. For example, the aromatization catalyst can be one that is in the form of a coating on the internal surface of a channeled thermal mass located in RTRFR's aromatization stage. Additionally or alternatively, the aromatization catalyst can be in the form of a composite with the thermal mass or segment thereof located within the catalytic aromatization stage.

In certain aspects, the aromatization catalyst comprises at least one dehydrocyclization catalyst, such as those which comprise a support (e.g., a porous zeolitic or non-zeolitic structure, which may alternatively be termed a molecular sieve component herein), optionally a matrix component, and optionally a catalytically active metal. The dehydrocyclization catalyst can be a conventional catalyst, although the invention is not limited thereto. Conventional dehydrocyclization catalysts typically contain one or more catalytically active metal in a total amount ≥about 0.005 wt. % (e.g., ≥about 0.01 wt. %, or ≥about 0.05 wt. %, or ≥about 0.1 wt. %, ≥ or about 0.3 wt. %, or ≥about 0.5 wt. %, or ≥about 0.7 wt. %, or ≥about 0.9 wt. %, or ≥about 1.2 wt. %, or ≥about 1.5 wt. %, or ≥about 1.8 wt. %; additionally or alternatively, ≤about 10 wt. %, or ≤about 7.0 wt. %, or ≤about 5.0 wt. %, or ≤about 3.0 wt. %, or ≤about 2.5 wt. %, or ≤about 2.0 wt. %, or ≤about 1.8 wt. %, or ≤about 1.5 wt. %, or ≤about 1.2 wt. %, or ≤about 0.9 wt. %, or ≤about 0.7 wt. %), based on a total weight of dehydrocyclization catalyst. Catalytically active metals generally comprise or consist essentially of one or more elements selected from Groups 3 to 13 of the Periodic Table (e.g., as a neutral element or as an oxide, sulfide, phosphide, nitride, and/or carbide of the element) deposited on or in pores of the support portion of the dehydrocyclization catalyst. Exemplary catalytically active metals can include magnesium, scandium, yttrium, titanium, zirconium, hafnium, vanadium, niobium, tantalum, chromium, molybdenum, tungsten, manganese, rhenium, iron, ruthenium, cobalt, rhodium, nickel, palladium, platinum, copper, silver, gold, gallium, zinc, indium, tin, a lanthanide, an actinide, or a combination thereof.

The catalytically active metal can be provided on, in, or proximate to the support portion of the dehydrocyclization catalyst in any manner, for example by conventional methods such as impregnation or ion exchange. At least part of the catalytically active metal may additionally or alternatively be present within a crystalline framework of the support.

However, in some aspects, the catalytically active metal (s) on or in the pores of the support portion of the dehydrocyclization catalyst can comprise substantially no magnesium, scandium, yttrium, titanium, zirconium, hafnium, vanadium, niobium, tantalum, chromium, molybdenum, tungsten, manganese, rhenium, iron, ruthenium, cobalt, rhodium, nickel, palladium, platinum, copper, silver, gold, gallium, indium, tin, lanthanides, or actinides. In such aspects, the catalytically active metal(s) may comprise, consist essentially of, or consist of zinc, e.g., in an amount ranging from about 0.05 wt. % to about 3.0 wt. %, based on a total weight of dehydrocyclization catalyst. In some aspects, the dehydrocyclization catalyst may comprise substantially no catalytically active metal deposited on or in the pores of the support at all. In such aspects, without being bound by theory, it is believed that the discretization of the pyrolysis step, when driven to a high enough completion level (e.g., at least 55% average conversion of saturates to unsaturates, at least 60% conversion, at least 65% conversion, at least 70% conversion, at least 75% conversion, at least 80% conversion, at least 85% conversion, at least 90% conversion, or at least 95% conversion), effectively increases aromatics yield in the discretized aromatization step in the catalytic aromatization stage, even with only support and/or without additional catalytically active metal on/in the support.

Typically, the dehydrocyclization catalyst can include ≥30 wt. % of the support (e.g., ≥35 wt. %, or ≥40 wt. %, or ≥45 wt. %, or ≥50 wt. %, or ≥55 wt. %, or ≥60 wt. %, or ≥65 wt. %, or ≥70 wt. %, or ≥75 wt. %, or ≥80 wt. %, or ≥85 wt. %, or ≥90 wt. %, or ≥95 wt. %, or ≥98 wt. %, or ≥99 wt. %, or ≥99.9 wt. %; additionally or alternatively, ≤100 wt. %, or ≤99.9 wt. %, or ≤99 wt. %, or ≤98 wt. %, or ≤95 wt. %, or ≤90 wt. %, or ≤85 wt. %, ≤ or 80 wt. %, or ≤75 wt. %, or ≤70 wt. %, or ≤65 wt. %), based on a total weight of the dehydrocyclization catalyst.

In some aspects, the support can have a Constraint Index (as defined in U.S. Pat. No. 4,016,218) in the range of from 1-12 or from 2-12. In additional or alternative aspects, the support can comprise, consist essentially of, or be a porous zeolite containing a 10-ring, an 11-ring, or a 12-ring pore opening. In further additional or alternative aspects, the support can comprise, consist essentially of, or be a framework structure type of one or more of MFI, MEL, MOR, MTW, MWW, and FER. In still further additional or alternative aspects, the support can comprise, consist essentially of, or be one or more of ZSM-5, ZSM-11, ZSM-12, ZSM-21, ZSM-22, ZSM-23, ZSM-35, ZSM-38, ZSM-48, ZSM-50, ZSM-57, MCM-68, MCM-22, PSH-3, SSZ-25, ERB-1, ITQ-1, ITQ-2, MCM-36, MCM-56, and UZM-8 (preferably including at least ZSM-5, ZSM-11, ZSM-12, ZSM-22, ZSM-23, ZSM-35, and/or ZSM-48; more preferably including at least ZSM-5, ZSM-11, and/or ZSM-12; most preferably including at least ZSM-5). In situations in which the support is ZSM-5 and there is substantially no catalytically active metal, the dehydrocyclization catalyst can be described as H-ZSM-5. In yet further additional or alternative aspects, the support can have a relatively small crystal size, e.g., ≤0.08 micrometers (μm) such as in the range of 0.02 μm to 0.05 μm (notably, small crystal ZSM-5 and the method for determining molecular sieve crystal size are disclosed in U.S. Pat. No. 6,670,517, which is incorporated by reference herein in its entirety). In even further additional or alternative aspects, the support can comprise, consist essentially of, or be an aluminosilicate (substituted or unsubstituted, and zeolitic or non-zeolitic). For example, the aluminosilicate can be in a form where at least a portion of its original metal has been replaced, e.g., by ion exchange, with other suitable metal (typically metal cation) of Groups 1-13 of the Periodic Table (including boron).

When the support comprises, consists essentially of, or is at least one aluminosilicate, a silica:alumina ratio ($Si:Al_2$ atomic ratio) is typically ≥2, e.g., in the range from 5 to 100. The silica:alumina ratio is meant to represent the $Si:Al_2$ atomic ratio in the rigid anionic framework of the crystalline aluminosilicate. Additionally or alternatively, the dehydrocyclization catalyst can be made more resistant to deactivation (and advantageously to also increase aromatic hydrocarbon yield) by including phosphorous. When used, the amount of phosphorous is typically ≥1 wt. %, based on the weight of the support. For example, when present, the phosphorous:aluminum atomic ratio can be in a range from 0.01 to 1. Zeolites having a higher silica:alumina ratio can provide a lower catalyst acidity, e.g., in the range of from 44 to 100, such as 50 to 80, or 55 to 75. When present, the phosphorous:aluminum atomic ratio can be in a range of from 0.01 to 0.5.

When the support and catalytically active metal(s) together include less than 100 wt. % of the dehydrocyclization catalyst, ≥90 wt. % (such as ≥95 wt. %,≥98 wt. % or ≥99 wt. %) of the remainder of the dehydrocyclization catalyst can include the optional matrix component.

When present, the amount of matrix component (e.g., one or more inorganic binders) is not typically critical. When present, the amount of matrix component is typically in the range of 0.01 times the weight of the molecular sieve component to about 0.9 times the weight of the molecular sieve component, e.g., in the range of 0.02 to 0.8 times. The matrix component can include active materials, such as synthetic or naturally occurring zeolites. Alternatively or in addition, the matrix component can include clays and/or oxides such as alumina, silica, silica-alumina, zirconia, titania, magnesia or mixtures of these and other oxides. The matrix component can include naturally occurring materials and/or materials in the form of gelatinous precipitates or gels including mixtures of silica and metal oxides. Clays may also be included with the oxide type binders for improved mechanical properties or ease of manufacture.

Additionally or alternatively, matrix component can include one or more substantially inactive materials. Inactive materials suitably serve as diluents to control the amount of average conversion so that products may be obtained economically and orderly without employing other means for controlling the rate of reaction. Additionally or alternatively to any phosphorous added to or impregnated into the molecular sieve component, the matrix component can optionally include phosphorous, e.g., to lessen catalyst acidity. Notably, lessening catalyst acidity can decrease the amount of catalyst coke produced during catalytic conversion of feed components to aromatic hydrocarbons. Suitable phosphorous-containing matrices are disclosed in U.S. Pat. No. 5,026,937, which is incorporated by reference herein in its entirety. In certain aspects, the dehydrocyclization catalyst can be substantially free of matrix and/or binder (e.g., contains ≤1 wt. % of matrix, such as ≤0.1 wt. %).

The aromatization catalyst may be subjected to one or more treatments, e.g., a selectivation treatment to increase selectivity for producing desired aromatic hydrocarbon compounds (such as para-xylene). For example, selectivation can be carried out before introduction of the catalyst into the reactor and/or in situ in the reactor, e.g., by contacting the catalyst with a selectivating agent, such as at least one organosilicon compound in a liquid carrier, and subsequently calcining the catalyst at a temperature of 350° C. to 550° C. This selectivation procedure can be repeated two or more times and can alter diffusion characteristics of the catalyst, e.g., such that the formation of para-xylene over other xylene isomers is favored. Such a selectivation process is described in detail in U.S. Pat. Nos. 5,633,417 and 5,675,047.

Representative Catalytic Aromatization Conditions

The catalytic aromatization reaction can be carried out in the catalytic aromatization stage of the RTRFR by exposing the pyrolysis product from the pyrolysis stage to a catalytically effective amount of one or more of the specified aromatization catalysts. Representative conditions within the catalytic aromatization zone of the catalytic aromatization stage during reaction mode typically include a maximum temperature ≤750° C., e.g., ≤700° C., such as ≤650° C.; an average temperature within the catalytic aromatization stage's catalytic region in the range of from 350° C. to 700° C., e.g., 400° C. to 650° C.; a pressure ≥10 psia (68.9 kPaa), e.g., 0 psig (101 kPag) to 300 psig (2170 kPag); and a space velocity (GHSV) ≥500 $hr^{-1}$, e.g., ≥1100 $hr^{-1}$, such as in a range from 1500 $hr^{-1}$ to 40000 $hr^{-1}$. The specified pressure is the pressure at the catalytic aromatization stage's inlet, not the average pressure. Typical catalytic aromatization stage conditions can include an average temperature in a range from 380° C. to 675° C., e.g., from 400° C. to 650° C.; a pressure in the range of from 20 psia (140 kPaa) to 300 psig (2.1 MPag), e.g., from 30 psia (210 kPaa) to 80 psia (550 kPaa); a space velocity (GHSV) in the range of from 2000 $hr^{-1}$ to 20000 $hr^{-1}$, e.g., 2500 $hr^{-1}$ to 15000 $hr^{-1}$.

In some aspects, the aromatization conditions can be sufficient to convert the unsaturated $C_{2+}$ hydrocarbons in the pyrolysis product at an average conversion ≥30 wt. % (e.g., ≥35 wt. %, or ≥40 wt. %, or ≥45 wt. %, or ≥50 wt. %, or ≥55 wt. %, or ≥60 wt. %, or ≥65 wt. %, or ≥70 wt. %, or ≥75 wt. %, or ≥80 wt. %, or ≥85 wt. %, or ≥90 wt. %. The unsaturated $C_{2+}$ hydrocarbons in the pyrolysis product cascaded from the pyrolysis stage into aromatic compounds typically comprise benzene, toluene, o-xylene, m-xylene, p-xylene, ethylbenzene, styrene, α-methylstyrene, mesitylene, 1,2,3-trimethylbenzene, 1,2,4-trimethylbenzene, cumene, naphthalene, methylnaphthalene, and mixtures thereof; in particular, benzene, toluene, o-xylene, m-xylene, p-xylene, ethylbenzene, mesitylene, 1,2,3-trimethylbenzene, 1,2,4-trimethylbenzene, naphthalene, methylnaphthalene, and mixtures thereof; preferably, benzene, toluene, o-xylene, m-xylene, p-xylene, naphthalene, methylnaphthalene, and mixtures thereof).

The catalytic aromatization reaction typically is on-average endothermic. Heat for the catalytic aromatization can be obtained, e.g., by first heating during regeneration mode a thermal mass or segment thereof located in the catalytic aromatization stage. One way to carry out the heating involves using the oxidant and fuel streams introduced into the RTRFR during regeneration mode, e.g., by combusting at least a portion of the oxidant and at least a portion of the fuel, and then transferring heat from the combustion to the thermal mass in the catalytic aromatization stage. Alternatively, or in addition, heat can be transferred to the thermal mass from the exothermic catalyst coke removal carried out during regeneration mode. Then, during reaction mode, heat can be transferred from the preheated thermal mass to the catalytic aromatization process. Typically, however, a majority of the heat consumed by the catalytic aromatization is obtained by a direct transfer of heat from the pyrolysis product to the aromatization process. Doing so can be beneficial because it decreases (or entirely obviates) the need for the RTRFR's second heat transfer stage.

It has been unexpectedly found that it can be beneficial to carry out a purge mode after reaction mode, it is typically not beneficial to do so after regeneration mode. Surprisingly, it has been observed that when a purge mode is carried out after reaction mode the yield of aromatics in the RTRFR's aromatization product (particularly BTX and BTXN yield) is appreciably less than is the case when a purge mode is carried out, particularly when $\Delta t_2 \leq 60$ seconds, e.g., 0.1 second to 60 seconds, such as 0.5 second to 30 seconds, or 1 second to 10 second, or 1 second to 5 seconds. While not wishing to be bound by any theory or model, it is believed that an increased amount of residual oxidant is beneficially present in the RTRFR during reaction mode when a purge mode is not carried out beforehand. This in turn decreases the amount of molecular hydrogen in the pyrolysis product because the residual oxidant preferentially reacts with molecular hydrogen in the pyrolysis product instead of with hydrocarbon (particularly unsaturated hydrocarbon) present in the hydrocarbon feed and pyrolysis product. It is believed that the decrease in molecular hydrogen in the catalytic aromatization stage shifts the reaction toward aromatization and away from hydrogenation, resulting in an increase in selectivity to aromatics, particularly selectivity to BTX and BTXN. The residual oxidant can be in the form of oxygen stored in one more SOCs included in thermal mass located in the pyrolysis stage.

Aromatization Product

The aromatization product generally comprises (i) aromatic hydrocarbon produced from at least a portion of the pyrolysis product converted in the catalytic aromatization stage and (ii) at least a portion of any pyrolysis product that is not converted in the catalytic aromatization stage, including at least a portion of any feed hydrocarbon that is not converted in either the pyrolysis stage or the catalytic aromatization stage. Typically, $\geq 10$ wt. % of total hydrocarbon in the hydrocarbon feedstock is converted to olefinic and aromatic compounds (e.g., ethylene, benzene, toluene, xylenes, naphthalene, and combinations thereof) which are conducted away from the RTRFR as part of the aromatization product, e.g., $\geq 20$ wt. %, such as $\geq 30$ wt. %, or $\geq 40$ wt. %, or $\geq 50$ wt. %.

The aromatization product typically has an appreciable content of aromatic compounds (e.g., benzene, toluene, o-xylene, m-xylene, p-xylene, ethylbenzene, styrene, α-methylstyrene, mesitylene, 1,2,3-trimethylbenzene, 1,2,4-trimethylbenzene, cumene, naphthalene, methylnaphthalene, and mixtures thereof; in particular, benzene, toluene, o-xylene, m-xylene, p-xylene, ethylbenzene, mesitylene, 1,2,3-trimethylbenzene, 1,2,4-trimethylbenzene, naphthalene, methylnaphthalene, and mixtures thereof; preferably, benzene, toluene, o-xylene, m-xylene, p-xylene, naphthalene, methylnaphthalene, and mixtures thereof), such as $\geq 30$ wt. %, or $\geq 35$ wt. %, or $\geq 40$ wt. %, or $\geq 45$ wt. %, or $\geq 50$ wt. %, or $\geq 55$ wt. %, or $\geq 60$ wt. %, or $\geq 65$ wt. %, or $\geq 70$ wt. %, or $\geq 75$ wt. % aromatic compounds, based on total weight of the aromatization product as it emerges from the catalytic aromatization stage.

In comparison with conventional processes, the combined pyrolysis and aromatization reactions carried out during reaction mode may be capable of increased conversion of $C_{2+}$ hydrocarbon without a significant decrease in the selectivity for aromatic hydrocarbon, and without excessive selectivity for light hydrocarbon compounds such as methane. For example, aromatic hydrocarbon selectivity may be $\geq 30$ wt. %, e.g., $\geq 40$ wt. %, such as $\geq 50$ wt. %, or $\geq 60$ wt. %. Methane selectivity may be $\leq 40$ wt. %, e.g., $\leq 30$ wt. %, such as $\leq 20$ wt. %. $C_{2+}$ paraffin selectivity may be $\leq 5$ wt. %, e.g., $\leq 1$ wt. %. $C_{2+}$ olefin selectivity may be $\leq 20$ wt. %, e.g., $\leq 10$ wt. %. Advantageously, the process may exhibit high $C_{2+}$ conversion with low selectivity for methane over a wide range of conversion values. For example, the process can have an aromatic hydrocarbon selectivity $\geq 40$ wt. % and a methane selectivity $\leq 40$ wt. %. Very large $C_{2+}$ hydrocarbon conversion can be achieved in this discretized multi-step process, as compared to conventional processes, and in particular very large ethane conversion can be achieved. For example, when operating the process under the specified conditions, the dehydrocyclization catalyst, $C_{2+}$ average conversion (e.g., the $C_2$-$C_4$ paraffinic hydrocarbon conversion, and in particular ethane conversion) may be $\geq 65$ wt. %, e.g., $\geq 70$ wt. %, such as $\geq 75$ wt. %, or $\geq 80$ wt. %, or in the range of from 65 wt. % to 95 wt. %. In certain aspects, the aromatization product has a total aromatic (or BTX or BTXN) hydrocarbon content of $\geq 5$ wt. % (e.g., $\geq 10$ wt. %, or $\geq 15$ wt. %, or $\geq 20$ wt. %, or $\geq 25$ wt. %, or $\geq 30$ wt. %, or $\geq 35$ wt. %, or $\geq 40$ wt. %, or $\geq 45$ wt. %, or $\geq 50$ wt. %; additionally or alternatively, from 1 wt. % to 95 wt. % or 10 wt. % to 75 wt. %), based on the weight of the aromatization product. The process can produce a desirable BTX or BTXN product, e.g. having an increased yield of desirable xylene isomers and a decreased yield of less desirable $C_{11+}$ aromatic hydrocarbons in comparison with conventional processes.

Any convenient method can be employed for recovery of aromatic hydrocarbon from the aromatization product, including conventional methods such as boiling point separation, gravity separation, solvent extraction, etc. Non-aromatic $C_{2+}$ hydrocarbon may optionally be recovered from the aromatization product, e.g., for recycle as a feed component. Methane and/or molecular hydrogen can additionally or alternatively be recovered from the aromatization product, e.g., for storage, further processing, and/or use as a fuel. The process can be compatible with further processing of the recovered aromatic hydrocarbon, e.g., methanation of toluene and/or successive methanation of benzene to produce xylenes such as paraxylene.

If desired, the aromatization product can be further purified, e.g., to reduce a concentration of less desirable pyrolysis products and/or to enhance a concentration of more desirable pyrolysis products, thereby forming a desired pyrolysis product. Although less desirable and more desirable pyrolysis products may depend upon a particular application or on an integrated scheme, in some aspects, less desirable pyrolysis products can comprise unreacted feed, other saturated hydrocarbons different from the unreacted feed, and any non-volatiles. Specifically, less desirable pyrolysis products can comprise one or more of methane, ethane, propane, butanes, hexanes, and hydrogen. In additional or alternative aspects, more desirable pyrolysis products can comprise olefinic and/or aromatic compounds, preferably at least aromatic compounds. Specifically, more desirable pyrolysis products can comprise one or more of ethylene, acetylene, propylene, 1,3-butadiene, benzene, toluene, o-xylene, p-xylene, and naphthalene. In some aspects in which the aromatization product can be further purified, the purification process can advantageously reduce a concentration of saturated hydrocarbons in the aromatized product, so that the purified aromatization product contains ≤5000 wt. ppm (e.g., ≤3000 wt. ppm, or ≤2000 wt. ppm, or ≤1000 wt. ppm, or ≤750 wt. ppm, or ≤500 wt. ppm, or ≤300 wt. ppm, or ≤200 wt. ppm, or ≤100 wt. ppm) saturated hydrocarbons, based on a total amount of hydrogen and hydrocarbons in the purified aromatization product.

Following reaction mode, regeneration mode is carried out to at least partially reheat the RTRFR and at least partially regenerate the aromatization catalyst so that reaction mode can be resumed.

Regeneration Mode

Regeneration mode accomplishes at least (i) reheating the pyrolysis stage to establish a temperature profile that is sufficient for carrying out pyrolysis in subsequent reaction mode operation, (ii) removing sufficient coke deposits from the vicinity of aromatization catalyst in the catalytic aromatization stage so that during reaction mode both a satisfactory average conversion of the pyrolysis product and a satisfactory aromatic hydrocarbon yield can be achieved, and optionally (iii) storing oxygen in the pyrolysis stage for reaction with hydrogen during subsequent reaction mode operation. Regeneration mode is carried out for a time duration sufficient to accomplish both (i) and (ii) and optionally (iii). When the reactor includes one or more heat transfer stages, regeneration mode can also accomplish cooling and/or heating these stages.

In those aspects where the combustion of coke deposits in the pyrolysis and/or aromatization stages proceeds more rapidly than reactor reheating, the minimum time duration for regeneration mode is the amount of time needed under regeneration conditions (combustion conditions) for the RTRFR to abstract sufficient heat from the coke combustion, fuel combustion, and any direct or indirect heat transfers (e.g., to/from heat transfer zones) to provide an RTRFR temperature profile suitable for carrying out the specified pyrolysis and catalytic aromatization in a subsequent reaction mode. In those aspects where the RTRFR reheating proceeds more rapidly than the combustion of coke deposits in the pyrolysis stage and aromatization stage, the minimum time duration for regeneration mode is the amount of time needed under regeneration conditions which remove sufficient catalyst coke deposits for carrying out the specified pyrolysis and catalytic aromatization in a subsequent reaction mode. In these aspects, the minimum time duration of regeneration mode is typically the time needed to accomplish removal of ≥50.0 wt. %, e.g., ≥75.0 wt. %, such as ≥90.0 wt. %, of accumulated coke deposits in catalytic regions of the catalytic aromatization stage. Generally, the time duration of regeneration mode ($\Delta t_2$) is ≤500 seconds, e.g., ≤100 seconds, such as ≤10 seconds, or ≤1 second, in the range of 0.1 seconds to 500 seconds, or 1 second to 30 seconds. Carrying out regeneration mode for a time in these ranges has been found to decrease the content of coke on the aromatization catalyst to ≤10 wt. % (e.g., ≤8 wt. %, or ≤6 wt. %, or ≤5 wt. %, or ≤4 wt. %, or ≤3 wt. %, or ≤2 wt. %, or ≤1 wt. %, or ≤0.5 wt. %), based on the weight of the coked aromatization catalyst.

During regeneration mode, combustion feeds (e.g., fuel and oxidant feeds) are supplied to the RTRFR. At least a first portion of the oxidant is used for regeneration of the aromatization catalysts, typically by oxidizing at least a portion of any catalyst coke that may have been deposited on the aromatization catalyst during previous pyrolysis mode operation. The first portion of the oxidant may also be used for combusting combustible deposits that may have accumulated in the second heat transfer stage during previous pyrolysis mode operation. A second portion of the oxidant is used primarily for combustion with the fuel (typically in a mixing-distribution stage) to reheat the pyrolysis stage so that the RTRFR can be switched back to reaction mode for continued production of the desired aromatized product. When substantially all of the oxidant is introduced into the RTRFR at the second opening, as shown by line 193 in FIG. 1, the second portion of the oxidant is typically what remains of the oxidant after the first portion has been consumed in stages 180 and 160.

The combustion feeds used during regeneration mode include at least one fuel feed and at least one oxidant feed. Suitable combustion feeds are disclosed in U.S. Patent Application Publication No. US2017-0088491A1 and in U.S. Pat. No. 7,943,808, which are incorporated by reference herein in their entireties. Typically, the fuel is derived from, comprises, consists essentially of, or consists of one or more of hydrogen, CO, methane, methane containing streams, such as coal bed methane, biogas, associated gas, natural gas and mixtures or components thereof, etc. The fuel typically comprises one or more of molecular hydrogen, synthesis gas (mixtures of CO and $H_2$), and hydrocarbon, such as ≥10.0 wt. % hydrocarbon, or ≥50.0 wt. % hydrocarbon, or ≥90.0 wt. % hydrocarbon. The oxidant is typically one or more of molecular oxygen, ozone, and air, including molecular oxygen in air.

The combustion feed(s) may additionally include non-combustible but volatile diluents such as $N_2$, $CO_2$, $H_2O$, and/or other inert gases. In some aspects, unreacted or inert gas within the oxidant feedstream can act as an in situ sweep gas, helping to direct oxygen-depleted gas from the oxidant feedstream (and any water-gas shift gases present) from the combustion reaction toward the flue gas outlet port.

In aspects where an increase in aromatics yield is desired during reaction mode, it is typically desirable to decrease or even substantially prevent water (in any form) from contacting the aromatization catalyst during regeneration mode. One way to do so is to utilize combustion feed comprising ≤10 mole % of water per mole of combustion feed, e.g., ≤5 mole %, or ≤1 mole %. For example, one or more of the fuel feed, oxidant feed, and diluent (if any) can comprise ≤10 mole % of water in any form, e.g., ≤5 mole %, or ≤1 mole %. Dry fuel feed, dry oxidant feed, and dry diluent are suitable.

In certain aspects, the oxidant feedstream is a dry oxygen-containing stream having at least a sufficient oxygen content for combustion of the fuel. It can be desirable for the second portion of oxidant to contain an amount of oxidant that is greater than the amount needed for stoichiometric combustion of the fuel, e.g., (i) when it is desired to use excess oxidant as a heat transfer medium to transfer heat to stage 110 and (ii) when it is desired to store oxidant in the pyrolysis stage during regeneration mode for release during reaction mode. Option (ii) has been found to be effective for preferentially scavenging hydrogen produced during the pyrolysis. Doing so has been found to increase yield of desired $C_{2+}$ unsaturated hydrocarbon in the pyrolysis product, which in turn increases the yield of aromatic hydrocarbon (particular BTX and BTXN) in the aromatization product.

The fuel feedstream and the oxidant feedstream can be mixed at or prior to entering the RTRFR. Alternatively or in addition, the fuel feedstream and the oxidant feedstream can be separately introduced into the RTRFR and separately flowed through separate channels of a honeycomb channel arrangement in portions of the thermal mass located upstream of the pyrolysis stage, "upstream" in this sense being with respect to the average flow direction of the oxidant feedstream. The fuel feedstream and the oxidant feedstream can typically be heated as they flow through the channels, e.g., by heat transferred to these portions during quenching of pyrolysis products during a preceding pyrolysis step. Following heating, the fuel feedstream and the oxidant feedstream can then be mixed in situ (e.g., in a mixer-distributor located in mixing-distribution stage 145 of FIG. 1), so that combustion can occur. Typically, ≥90 wt. % of the fuel flow is combusted in the RTRFR at a location that is downstream of the catalytic aromatization stage, downstream in this sense being with respect to the average flow direction of the oxidant feedstream.

Regeneration mode produces first and second combustion products. The first combustion product results primarily from the combustion of catalyst coke, and the second combustion product results primarily from the combustion of fuel and oxidant and optionally from the combustion of combustible deposits in the pyrolysis stage. The first and second combustion products combine in the RTRFR to form a flue gas, and are conducted away from the RTRFR via a flue gas outlet (e.g., outlet 199 of FIG. 1).

Once a fuel of the desired caloric content (heating value) has been selected, the amounts of fuel and oxidant conducted to the RTRFR during regeneration mode can be specified in terms of the amount of oxidant needed for combusting the RTRFR's accumulated coke deposits ("$OC_a$") and the amount of oxidant ("$OC_b$") needed for the substantially stoichiometric combustion of the fuel to achieve the desired RTRFR temperature profile for a subsequent reaction mode. Typically, the oxidant supplied during regeneration mode is $Z \cdot (OC_a + OC_b)$, wherein Z is in the range of 0.8 to 10.0, e.g., in the range of 1.0 to 3.0, and the amounts $OC_a$ and $OC_b$ are on a molar basis. When Z>1.0, the excess oxidant can be utilized, e.g., for one or more of (i) moderating RTRFR temperature during regeneration mode (as disclosed in U.S. Pat. No. 7,943,808), (ii) conveying heat within the RTRFR from one zone to another, and (iii) replenishing an SOC located in the pyrolysis stage. Typically, oxidant flow rate and fuel flow rate remain substantially constant for the duration regeneration mode.

Typically, regeneration mode includes heating (or reheating) thermal mass located in the pyrolysis stage to an average temperature of at least 700° C. (e.g., at least 750° C., at least 800° C., at least 850° C., at least 900° C., at least 950° C., at least 1000° C., at least 1050° C., at least 1100° C., at least 1150° C., or at least 1200° C.; optionally up to 1600° C., up to 1500° C., up to 1400° C., up to 1350° C., up to 1300° C., up to 1250° C., or up to 1200° C.), primarily by combusting fuel with the second portion of the oxidant.

Combustion conditions in the RTRFR during regeneration mode (fuel combustion and coke deposit combustion) are selected to provide a temperature profile during regeneration having a maximum temperature in the vicinity of the aromatization catalyst that is ≤750° C. Typically, combustion conditions including fuel choice and amount, oxidant choice and amount, the location of fuel combustion in the reactor, etc., are selected to provide a maximum temperature to which the aromatization catalyst is exposed during regeneration of about 700° C., more typically of about 650° C. In certain aspects, combustion conditions during regeneration mode are selected to achieve a temperature at the location where the oxidant first contacts the aromatization catalyst that is ≤350° C., e.g., ≤325° C., such as ≤300° C. FIG. 1 is an example of one way to decrease temperature in the catalytic aromatization stage during regeneration mode while providing sufficient heating (or reheating) to the pyrolysis stage. As shown in the FIGURE, all fuel from line 195 is passed through conduit 190 to mixing-distribution stage 145, in order to prevent fuel-oxidant combustion in the catalytic aromatization stage during regeneration mode. This configuration has an additional benefit of decreasing the exposure of the aromatization catalyst to steam during regeneration mode, e.g., steam produced by the fuel-oxidant combustion, because conduit 190 conveys the fuel to a combustion location that is downstream of aromatization stage 160. If additional heating of the catalytic aromatization stage is needed beyond that provided by catalyst coke combustion, a portion of the fuel from line 195 can be diverted to the catalytic aromatization stage for combustion with oxidant from line 193.

Pressure in the pyrolysis stage and aromatization stage of the RTRFR during regeneration mode (and typically purge mode also) is typically comparable to that subsisting in those stages during pyrolysis mode. For example, during regeneration mode the pressure in the pyrolysis stage and the catalytic aromatization stage can be ≥5 psig (30 kPag), ≥15 psig (100 kPag), ≥40 psig (280 kPag), ≥80 psig (550 kPag), or ≥120 psig (830 kPag). For practical considerations on total pressure, the regeneration mode can be carried out at a total pressure of ≤500 psig (3.5 MPag), ≤300 psig (2.1 MPag), or ≤150 psig (1.0 MPag).

Purge Step/Mode of a Reverse-Flow Reactor

Because an oxidant is (cyclically) introduced into the reactor during the regeneration mode, residual oxidant could remain in the RTRFR, which can affect different reactions, depending on the residual oxidant levels and the sensitivity of such reactions to oxidants. Some hydrocarbon conversion processes, such as some thermal/catalytic pyrolysis processes can be particularly sensitive to, and detrimentally affected by, even relatively low levels of residual oxidant. As a result, a purge step/mode can be introduced to purge the RTRFR of residual oxidant down to a sufficiently low level, again depending on the sensitivity required for the (cyclic) pyrolysis/mode to attain the requisite or desired levels of desirable (thermal) pyrolysis products. In the purge mode, a purge fluid (typically a gas and typically relatively inert to the process, such as argon, neon, nitrogen, or the like, or a combination thereof) can be introduced into the reaction (thermal pyrolysis) zone to flush/carry away residual oxidant (oxygen) and/or residual partially/completely oxidized hydrocarbons left from the regeneration step/mode (including water-gas shift gases such as hydrogen, CO, $CO_2$, and the like).

The sweep efficiency of the purge mode can be evaluated in several ways, such as a volume of purge gas necessary to achieve a target maximum oxidant concentration and/or a maximum water-gas shift gas concentration at an outlet of the RTRFR body (though the relevant reaction zone boundary is usually the more relevant location, measurement is usually much more convenient at the flue gas/purge outlet port(s)/valve(s)). The target maximum oxidant and/or water-gas shift gas concentrations during regeneration mode, can depend on the sensitivity of the (cyclic) hydrocarbon conversion (thermal pyrolysis) reaction and/or on the desired product selectivity and/or purity.

Although desired/acceptable residual oxidant and/or water-gas shift gas concentrations can vary in pyrolysis reactions, some residual oxidant (oxygen) and/or water-gas shift gas concentrations can individually or collectively be, for example, ≤20000 ppm (by mole), or ≤10000 ppm, or ≤5000 ppm, or ≤2000 ppm, or ≤1000 ppm, or ≤750 ppm, or ≤500 ppm, or ≤300 ppm, or ≤200 ppm, or ≤100 ppm, or ≤50 ppm, or ≤20 ppm, or ≤10 ppm.

In some aspects, the purge mode can function to remove oxidant (oxygen) and water-gas shift gases from the RTRFR, thereby reducing an oxygen content in the RTRFR to ≤about 10000 ppm (by mole) (e.g., ≤about 5000 ppm, or ≤about 2000 ppm, or ≤about 1000 ppm, or ≤about 750 ppm, or ≤about 500 ppm, or ≤about 300 ppm, or ≤about 200 ppm, or ≤about 100 ppm, or ≤about 50 ppm, or ≤about 20 ppm, or ≤about 10 ppm) and/or can reduce a water-gas shift gas content to ≤about 10000 ppm (by mole) (e.g., ≤about 5000 ppm, or ≤about 2000 ppm, or ≤about 1000 ppm, or ≤about 750 ppm, or ≤about 500 ppm, or ≤about 300 ppm, or ≤about 200 ppm, or ≤about 100 ppm, or ≤about 50 ppm, or ≤about 20 ppm, or ≤about 10 ppm).

EXAMPLES

Example 1

In Example 1, the feasibility of a discretized (two-step) reaction process, including a thermal pyrolysis step (to form unsaturated compounds in relatively high yield from a highly saturated feed) and a catalytic aromatization step (to for aromatic compounds in relatively high yield from a highly unsaturated cascaded feed), is explored. In this Example, the proof of concept is attained by separate demonstration of the step of thermal pyrolysis of ethane feed to attain a product rich in ethylene and unsaturates and of the step of catalytic aromatization of an unsaturated feed to form a product rich in aromatics, particularly BTXN (benzene, toluene, xylenes, and naphthalene).

Ethane pyrolysis is experimentally demonstrated using a representative RTRFR apparatus similar to that in FIG. 1, but modified to exclude tube 190 and the catalytic aromatization stage 160 (and the catalyst therein). In such an RTRFR, a range of yields and conversions comparable with conventional steam cracking furnaces can be achieved. The thermal pyrolysis portion of Example 1 is conducted at about 25 psig and ~700° C. to ~800° C. to attain ~70% average ethane conversion (by weight), with ethylene yields of about 50% (by weight) being obtained. In addition to the ethylene, the thermal pyrolysis yielded other select co-products, namely about 4 wt. % hydrogen, about 8 wt. % methane, about 1 wt. % acetylene, about 2 wt. % propylene, about 2 wt. % butenes, and about 3 wt. % benzene.

Catalytic aromatization (dehydrocyclization) is experimentally demonstrated in an RTRFR apparatus similar to that of FIG. 1, but modified to exclude tube 190 and the pyrolysis stage 130. In such an RFR apparatus, the cascading pyrolysis product is approximated as equimolar amounts of ethylene and hydrogen, and the catalytic reaction is accomplished in a fixed bed plug flow reactor. The catalytic aromatization portion of Example 1 is conducted at about 15 psig, ~570° C. to ~665° C., and ~2.25 hr$^{-1}$ to ~7.5 hr$^{-1}$ weight hourly space velocity over the aromatization catalyst. The aromatization catalyst was a ZSM5 support having a silica:alumina ratio of about 30 and containing about 3 wt. % gallium active metal. The average ethylene conversion is found to range between ~86% and ~99% (by weight), with a catalytic selectivity of about 54% to about 79% to BTXN products being observed, depending upon the exact catalytic conditions.

Example 2

In Example 2, the reverse flow reactor configuration shown in FIG. 1 is used to demonstrate a discretized (two-step) reaction process, including a thermal pyrolysis step (to form unsaturated compounds in relatively high yield from a highly saturated feed) and a catalytic aromatization step (to for aromatic compounds in relatively high yield from a highly unsaturated cascaded feed). Before the start of the reaction mode, the RTRFR is operated in regeneration mode, during which dry air is used the dry oxygen-containing feedstream 193, and dry hydrogen gas (≥98 wt. % $H_2$) is used as the fuel feedstream 195, with the target (molar) ratio of $O_2$ to $H_2$ being about 0.6. During reaction mode, a hydrocarbon feed 191 is provided comprising undiluted ethane, and catalytic aromatization stage 160 is filled with an ~42/~58 (weight) ratio of aromatization catalyst and (relatively inert) alumina particles, the aromatization catalyst being H-ZSM5 having a silica:alumina ratio of ~10 with substantially no catalytically active metal or matrix/binder. The H-ZSM-5 is neither selectivated nor steamed before use. The reactor conditions include ~15 psig pressure, a thermal pyrolysis zone temperature from about 700° C. to about 925° C., a catalytic aromatization zone temperature from about 400° C. to about 625° C., a catalytic aromatization zone weight hourly space velocity of ~10 hr$^{-1}$ to ~17 hr$^{-1}$, a reaction mode cycle length of about 9-12 seconds, a target residence time of about 0.5 seconds, and a target average ethane conversion in a range of from ~60% to ~70% (by weight). In a particular demonstration with a catalytic aromatization zone weight hourly space velocity of ~17 hr$^{-1}$, a pyrolysis cycle length of about 10.7 seconds, and an average ethane conversion of ~69% (by weight), Table 1 below shows the chemical makeup of the resulting aromatization product 197.

Operating in regeneration mode prevents appreciable catalyst coke accumulation long term, even though coke yield is 10.0 weight %. Since catalyst coke does not accumulate, an appreciable aromatics yield is maintained long-term, as evidenced by the 0.66 wt. % benzene yield.

TABLE 1

| Moiety | wt. % |
| --- | --- |
| hydrogen | 5.19 |
| methane | 3.57 |
| ethane | 30.6 |
| ethylene | 46.3 |
| acetylene | 0.04 |
| propane | 0.23 |
| propylene | 1.51 |
| butanes | 0.34 |
| 2-butene | 0.28 |
| 1-butene | 0.12 |
| isobutene | 0.18 |
| 1,3-butadiene | 0.31 |
| 2-pentene | 0.01 |
| 1-pentene | 0.29 |

TABLE 1-continued

| Moiety | wt. % |
|---|---|
| n-hexane | 0.02 |
| benzene | 0.66 |
| $C_{7+}$ non-coke | 0.33 |
| coke | 10.0 |

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is not incorporated by reference herein. As should be apparent, while forms of the invention have been illustrated and described, various modifications can be made without departing from the spirit and scope of the invention. Individual elements or features of a particular aspect are generally not limited to that particular aspect, but, where applicable, are interchangeable and can be used in a selected aspect, even if not specifically shown or described. The same may also be varied in many ways. Such variations are not to be regarded as a departure from the disclosure, and all such modifications are intended to be included within the scope of the disclosure. Accordingly, it is not intended that the invention be limited thereby. Likewise, the term "comprising" is considered synonymous with the term "including" for purposes of Australian law. Also, whenever a composition, an element, or a group of elements is preceded with the transitional phrase "comprising," it should be understood that the same composition or group of elements is contemplated with transitional phrases "consisting essentially of," "consisting of," "selected from the group of consisting of," or "is" preceding the recitation of the composition, element, or elements, and vice versa.

What is claimed is:

1. A hydrocarbon conversion process, comprising:
   (a) providing a hydrocarbon feed comprising $C_{2+}$ hydrocarbon;
   (b) providing an oxidant and a gaseous fuel;
   (c) providing tubular flow-through reactor, wherein the tubular flow-through reactor includes
      (i) a pre-heated pyrolysis stage and a catalytic aromatization stage, and
      (ii) at least one aromatization catalyst located in the catalyst aromatization stage,
      (iii) a mixing-distribution stage located between the pyrolysis stage and the aromatization stage,
      (iv) a pre-heated first heat transfer stage adjacent to the pyrolysis stage and opposite the mixing-distribution stage, and
      (v) a pre-cooled second heat transfer stage adjacent to the catalytic aromatization stage and opposite the mixing distribution stage;
   (d) during a second time interval
      (i) establishing a forward flow of the hydrocarbon feed to the pyrolysis stage,
      (ii) transferring heat from the pyrolysis stage to the hydrocarbon feed to pyrolyse under pyrolysis conditions at least a portion of the hydrocarbon feed's $C_{2+}$ hydrocarbon to produce a pyrolysis product comprising (A) $C_{2+}$ unsaturated hydrocarbon produced the pyrolysis and (B) unreacted hydrocarbon feed,
      (iia) flowing the pyrolysis product to the catalytic aromatization stage;
      (iii) aromatizing at least a portion of the $C_{2+}$ unsaturated hydrocarbon under aromatization conditions in the presence of the aromatization catalyst in the catalytic aromatization stage to produce an aromatization product comprising benzene,
      (iv) depositing coke on or proximate to the aromatization catalyst,
      (v) conducting the forward flow of aromatization product from the catalytic aromatization stage and away from the reverse-flow reactor, and
      (vi) decreasing the flow of the hydrocarbon feed to the pyrolysis stage; and
   (e) during a second time interval,
      (i) establishing a reverse flow of the fuel and a reverse flow of the oxidant toward the tubular flow-through reactor, the oxidant flow comprising first and second portions of the oxidant,
      (ii) combusting within the catalytic aromatization stage a first portion of the oxidant flow with at least a portion of the deposited coke to produce a reverse flow of a first combustion product,
      (iii) combusting in the tubular flow-through reactor a second portion of the oxidant flow with at least a portion of the fuel flow to produce a reverse flow of a second combustion product in the tubular flow-through reactor,
      (iv) conducting the reverse flows of the first and second combustion products away from the tubular flow-through reactor, wherein heat is transferred from the first and second combustion products to the tubular flow-through reactor to re-heat at least the pyrolysis stage, and
      (v) decreasing the reverse flows of fuel and oxidant.

2. The method of claim 1, wherein the hydrocarbon feed comprises less than 5 mol % $C_1$ hydrocarbons and at least 50 mol % $C_2$ hydrocarbons, based on a total amount of hydrocarbons in the hydrocarbon feedstream.

3. The method of claim 1, wherein at least one of (i) the hydrocarbon feed, (ii) the oxidant, and (iii) the fuel comprises ≤10% of water, on a molar basis.

4. The method of claim 1, wherein the aromatization catalyst comprises a porous zeolite containing a 10-ring, an 11-ring, or a 12-ring pore opening.

5. The method of claim 1, wherein the aromatization catalyst comprises one or more of ZSM-5, ZSM-11, ZSM-12, ZSM-21, ZSM-22, ZSM-23, ZSM-35, ZSM-38, ZSM-48, ZSM-50, ZSM-57, MCM-68, MCM-22, PSH-3, SSZ-25, ERB-1, ITQ-1, ITQ-2, MCM-36, MCM-56, and UZM-8.

6. The method of claim 1, wherein the aromatization catalyst comprises substantially no magnesium, scandium, yttrium, titanium, zirconium, hafnium, vanadium, niobium, tantalum, chromium, molybdenum, tungsten, manganese, rhenium, iron, ruthenium, cobalt, rhodium, nickel, palladium, platinum, copper, silver, gold, gallium, indium, tin, lanthanides, or actinides deposited on or in pores of the aromatization catalyst.

7. The method of claim 1, wherein the aromatization catalyst is a dehydrocyclization catalyst which comprises substantially no added active metals.

8. The method of claim 1, wherein the aromatization catalyst comprises from about 0.05 wt. % to about 3 wt. % zinc, based on a total weight of the aromatization catalyst.

9. The method of claim 1, wherein the pyrolysis conditions include (i) a temperature in the range of from 700° C. to 1100° C. and (ii) a pressure in the range of 7 psig to 150 psig.

10. The method of claim 1, wherein the pyrolysis product comprises at least 45 mol % ethylene, based on a total amount of hydrogen and hydrocarbons in the thermal pyrolysis product.

11. The method of claim 1, wherein the aromatization includes converting to aromatic hydrocarbon at least 70% of the pyrolysis product's $C_{2+}$ unsaturated hydrocarbon, and wherein the aromatization product further comprises one or more of toluene, o-xylene, m-xylene, p-xylene, ethylbenzene, styrene, a-methylstyrene, mesitylene, 1,2,3-trimethylbenzene, 1,2,4-trimethylbenzene, cumene, naphthalene, and methylnaphthalene.

12. The method of claim 1, wherein the aromatization includes converting to aromatic hydrocarbon at least a portion of any $C_1$-$C_{10}$ saturated hydrocarbon in the pyrolysis product.

13. The method of claim 1, further comprising carrying out a purge mode after step (d) and before step (e).

14. The method of claim 1, further comprising repeating steps (d) and (e).

15. The method of claim 1, wherein the first interval is in the range of from 0.05 second to 120 seconds, and the ratio of the first interval to the second interval is in the range of from 1:10 to 50:1.

16. The method of claim 1, wherein the tubular flow-through reactor is a reverse-flow reactor.

17. The method of claim 16, wherein the reverse-flow reactor is a regenerative thermal reverse-flow reactor ("RTRFR").

18. The method of claim 1, further comprising (i) during the first time interval transferring heat from the first heat transfer stage to the hydrocarbon feed and transferring heat from the aromatization product to the second heat transfer stage and (ii) during the second time interval, (A) transferring heat from the second heat transfer stage to the first portion of the oxidant and/or the second portion of the oxidant, (B) transferring heat from at least the second combustion product to the first heat transfer stage, and (C) combusting >90 wt. % of the fuel flow downstream of the catalytic aromatization stage.

19. The method of claim 18, wherein the aromatization conditions include a temperature ≤750° C.; a pressure ≥10 psia (68.9 kPa absolute); and a space velocity (GHSV) ≥500 $hr^{-1}$.

20. The method of claim 18, wherein during the second time interval at least a portion of any heat generated by the combustion of deposited coke is transferred to the catalytic aromatization stage, and during the first time interval transferring to the aromatization reaction at least a portion of the heat transferred to the catalytic aromatization stage during the second time interval.

21. The method of claim 1, further comprising separating from the aromatization product one or more of ethylene, acetylene, propylene, 1,3-butadiene, benzene, toluene, o-xylene, p-xylene, and naphthalene.

22. The method of claim 1, further comprising separating from the aromatization product and recycling to step (d) one or more of methane, ethane, propane, butanes, and hexanes.

23. The method of claim 1, further comprising separating molecular hydrogen from the aromatization product and recycling the separated molecular hydrogen to step (e) as a component of the fuel.

24. The method of claim 1, wherein during the second time interval the first and/or second combustion products sweep at least a portion of any residual pyrolysis from the pyrolysis stage and away from the tubular flow-through reactor.

25. A regenerative thermal reverse-flow reactor, comprising:
(a) a reactor vessel having an internal volume and having opposed first and second openings, which reactor includes,
  a first heat-transfer stage adjacent to the first end, a pyrolysis stage located inward of the first heat transfer stage, a mixing-distribution stage located inward of the of the pyrolysis stage, a second heat transfer stage located adjacent to the second opening, a catalytic aromatization stage located between the second heat transfer stage and the mixing-distribution stage, the stages being in fluidic communication with one another;
(b) at least one hydrocarbon feed conduit in fluidic communication with the first heat transfer stage to convey a forward flow of a dry hydrocarbon feed through the first opening into the first heat transfer stage;
(c) at least one aromatization catalyst located in the catalytic aromatization stage;
(d) at least one aromatization product conduit in fluidic communication with the second heat-transfer stage to convey a forward flow of an aromatization product away from the second heat-transfer stage and out of the reverse-flow reactor via the second opening;
(e) at least one fuel conduit in fluidic communication with the mixing-distribution stage but not in fluidic communication with the aromatization stag to convey a reverse flow of a fuel from the second opening to the mixing-distribution stage;
(f) at least one oxidant conduit in fluidic communication with the second heat-transfer stage to convey to the catalytic aromatization stage, the mixing-distribution stage, and the pyrolysis stage a reverse flow of a dry oxidant;
(g) at least one flue gas conduit in fluidic communication with the first heat transfer stage to convey a reverse-flow of a flue gas through the first heat transfer stage and out of the RTRFR via the first opening; and
(h) at least one flow controller to establish during a first time interval the forward flows of the hydrocarbon feed and the aromatization product during a reaction mode, and establish during a second time interval the reverse flows of the fuel, the oxidant, and the flue gas during a regeneration mode.

* * * * *